United States Patent [19]

Quattromani et al.

[11] Patent Number: 5,471,598
[45] Date of Patent: Nov. 28, 1995

[54] DATA DEPENDENCY DETECTION AND HANDLING IN A MICROPROCESSOR WITH WRITE BUFFER

[75] Inventors: Marc A. Quattromani, Allen; Raul A. Garibay, Jr., Richardson; Nital Patwa, Plano; Mark W. Hervin, Dallas, all of Tex.

[73] Assignee: Cyrix Corporation, Richardson, Tex.

[21] Appl. No.: 139,596

[22] Filed: Oct. 18, 1993

[51] Int. Cl.⁶ .................................................. G06F 13/00
[52] U.S. Cl. ........................ 395/449; 364/DIG. 2; 364/DIG. 1; 364/231.8; 364/234.4; 364/243.41; 364/964; 364/964.2; 395/800; 395/375; 395/467; 395/465; 395/496
[58] Field of Search ............................. 395/375, 200, 395/275, 400, 425, 800; 364/DIG. 1, DIG. 2

[56] References Cited

U.S. PATENT DOCUMENTS

| | | | |
|---|---|---|---|
| 3,916,388 | 10/1975 | Shimp et al. | 395/425 |
| 4,131,940 | 12/1978 | Moyer | 395/250 |
| 4,251,864 | 2/1981 | Kindell et al. | 395/425 |
| 4,408,275 | 10/1983 | Kubo et al. | 395/400 |
| 4,456,955 | 6/1984 | Yanagita et al. | 395/375 |
| 4,580,214 | 4/1986 | Kubo et al. | 395/425 |
| 4,594,679 | 6/1986 | George et al. | 364/754 |
| 4,814,976 | 3/1989 | Hansen et al. | 395/375 |
| 4,959,771 | 9/1990 | Ardini, Jr. et al. | 358/523 |
| 4,961,162 | 10/1990 | Nguyenphu et al. | 364/748 |
| 4,985,825 | 1/1991 | Webb, Jr. et al. | 395/375 |
| 4,992,938 | 2/1991 | Cocke et al. | 395/DIG. 1 |
| 4,992,977 | 2/1991 | Matoba et al. | 395/375 |
| 5,023,776 | 6/1991 | Gregor | 395/375 |
| 5,073,855 | 12/1991 | Staplin et al. | 395/375 |
| 5,075,840 | 12/1991 | Grohoski et al. | 395/800 |
| 5,123,097 | 6/1992 | Joyce et al. | 395/375 |
| 5,125,083 | 6/1992 | Fite et al. | 395/375 |
| 5,125,092 | 6/1992 | Prener | 395/800 |
| 5,142,631 | 8/1992 | Murray et al. | 395/375 |
| 5,168,561 | 12/1992 | Vo | 395/425 |
| 5,168,571 | 12/1992 | Hoover et al. | 395/800 |
| 5,202,972 | 4/1993 | Gusefski et al. | 395/425 |
| 5,222,223 | 6/1993 | Webb et al. | 395/425 |
| 5,226,126 | 7/1993 | McFarland et al. | 395/375 |
| 5,226,169 | 7/1993 | Gregor | 395/800 |
| 5,291,586 | 3/1994 | Jen et al. | 395/500 |
| 5,313,613 | 5/1994 | Gregor | 395/425 |

FOREIGN PATENT DOCUMENTS

0348652A3  1/1990  European Pat. Off. .

Primary Examiner—Robert B. Harrell
Attorney, Agent, or Firm—Andrew S. Viger; John L. Maxin

[57] ABSTRACT

A superscalar superpipelined microprocessor having a write buffer located between the core and cache is disclosed. The write buffer is controlled to store the results of write operations to memory until such time as the cache becomes available, such as when no high-priority reads are to performed. The write buffer includes multiple entries that are split into two circular buffer sections for facilitating the interaction with the two pipelines of the core; cross-dependency tables are provided for each write buffer entry to ensure that the data is written from the write buffer to memory in program order, considering the possibility of prior data present in the opposite section. Non-cacheable reads from memory are also ordered in program order with the writing of data from the write buffer. Features for handling speculative execution, detecting and handling data dependencies and exceptions, and performing special write functions (misaligned writes and gathered writes) are also disclosed.

6 Claims, 11 Drawing Sheets

DATA DEPENDENCY DETECTION AND HANDLING IN A MICROPROCESSOR WITH WRITE BUFFER

This application is related to copending U.S. applications Ser. No. 08/139,598 (CX00182) entitled "Gathered Writing of Data from a Write Buffer in a Microprocessor"; Ser. No. 08/138,790 (CX00184) entitled "Misaligned Write Handling in a Microprocessor with Write Buffer"; Ser. No. 08/138,652 (CX00185) entitled "Extra-wide Data Buffering for a Write Buffer in a Microprocessor"; Ser. No. 08/138,654 (CX00186) entitled "Control of Data for speculative Execution and Exception Handling in a Microprocessor with Write Buffer"; Ser. No. 08/138,651 (CX00187) entitled "Program Order Sequencing of Data in a Microprocessor with Write Buffer"; all filed contemporaneously herewith and assigned to Cyrix Corporation.

This invention is in the field of integrated circuits of the microprocessor type, and is more specifically directed to memory access circuitry in the same.

BACKGROUND OF THE INVENTION

In the field of microprocessors, the number of instructions executed per second is a primary performance measure. As is well known in the art, many factors in the design and manufacture of a microprocessor impact this measure. For example, the execution rate depends quite strongly on the clock frequency of the microprocessor. The frequency of the clock applied to a microprocessor is limited, however, by power dissipation concerns and by the switching characteristics of the transistors in the microprocessor.

The architecture of the microprocessor is also a significant factor in the execution rate of a microprocessor. For example, many modern microprocessors utilize a "pipelined" architecture to improve their execution rate if many of their instructions require multiple clock cycles for execution. According to conventional pipelining techniques, each microprocessor instruction is segmented into several stages, and separate circuitry is provided to perform each stage of the instruction. The execution rate of the microprocessor is thus increased by overlapping the execution of different stages of multiple instructions in each clock cycle. In this way, one multiple-cycle instruction may be completed in each clock cycle.

By way of further background, some microprocessor architectures are of the "superscalar" type, where multiple instructions are issued in each clock cycle for execution in parallel. Assuming no dependencies among instructions, the increase in instruction throughput is proportional to the degree of scalability.

Another known technique for improving the execution rate of a microprocessor and the system in which it is implemented is the use of a cache memory. Conventional cache memories are small high-speed memories that store program and data from memory locations which are likely to be accessed in performing later instructions, as determined by a selection algorithm. Since the cache memory can be accessed in a reduced number of clock cycles (often a single cycle) relative to main system memory, the effective execution rate of a microprocessor utilizing a cache is much improved over a non-cache system. Many cache memories are located on the same integrated circuit chip as the microprocessor itself, providing further performance improvement.

According to each of these architecture-related performance improvement techniques, certain events may occur that slow the microprocessor performance. For example, in both the pipelined and the superscalar architectures, multiple instructions may require access to the same internal circuitry at the same time, in which case one of the instructions will have to wait (i.e., "stall") until the priority instruction is serviced by the circuitry.

One type of such a conflict often occurs where one instruction requests a write to memory (including cache) at the same time that another instruction requests a read from the memory. If the instructions are serviced in a "first-come-first-served" basis, the later-arriving instruction will have to wait for the completion of a prior instruction until it is granted memory access. These and-other stalls are, of course, detrimental to microprocessor performance.

It has been discovered that, for most instruction sequences (i.e., programs), reads from memory or cache are generally more time-critical than writes to memory or cache, especially where a large number of general-purpose registers are provided in the microprocessor architecture. This is because the instructions and input data are necessary at specific times in the execution of the program in order for the program to execute in an efficient manner in contrast, since writes to memory are merely writing the result of the program execution, the actual time at which the writing occurs is not as critical since the execution of later instructions may not depend upon the result.

By way of further background, write buffers have been provided in microprocessors, such write buffers logically located between on-chip cache memory and the bus to main memory. These conventional post-cache write buffers receive data from the cache for a write-through or write-back operation; the contents of the post-cache write buffer are written to main memory under the control of the bus controller, at times when the bus becomes available.

By way of further background, pipelined microprocessors are known to be vulnerable to certain hazards commonly referred to as data dependencies. In general, data dependencies arise when two instructions at different stages in the pipeline require access to the same register or memory location, as the pipeline may access the register or memory location for the later instruction (in program order) before the earlier instruction has written data thereto, which results in erroneous operation. Techniques for detecting such data dependencies in conventional pipelined microprocessors are known in the art, as described in Patterson and Hennessy, *Computer Architecture: A Quantitative Approach* (Morgan Kaufmann, 1990), pp. 257–78. According to conventional techniques, detection of a data dependency or hazard is handled by stalling the pipeline until the earlier instruction (in program order) is completed, after which the later instruction can be processed. Of course, pipeline stalls result in loss of performance for the microprocessor.

It is therefore an object of the present invention to provide a microprocessor architecture which allows for storage of execution results in a write buffer prior to retiring data to cache or memory in a manner in which data dependencies may be detected.

It is a further object of the present invention to provide for special handling of data dependencies so as to avoid pipeline stalls.

It is a further object of the present invention to provide such special handling in such a manner that only the last in a series of writes to the same location is sourced to the CPU core.

It is a further object of the present invention to avoid such special handling for non-cacheable write operations.

It is a further object of the present invention to provide for allocation of write buffer locations with an indication that an otherwise apparent data dependency is in fact not a data dependency.

It is a further object of the present invention to provide such an architecture which is implemented in a superpipelined superscalar microprocessor architecture.

Other objects and advantages of the present invention will be apparent to those of ordinary skill in the art having reference to the following specification in combination with the drawings.

SUMMARY OF THE INVENTION

The invention may be implemented into a microprocessor by providing a write buffer. The write buffer is logically located between the core of the microprocessor and the memory (including off-chip main or cache memory and on-chip cache). Each write to memory executed by the core is made to the write buffer, rather than to the memory bus or cache; in this way, cache or memory reads are not impacted by writes performed by the core. The contents of the write buffer are written into cache or memory in an asynchronous manner, when the memory bus or cache is available.

Another feature of the present invention may be implemented in such a microprocessor with provisions for detecting data hazards or dependencies such as read-after-write (RAW) dependencies, particularly relative to data already written to the write buffers. Retiring of write buffer contents is prevented for those entries subject to a RAW dependency, thus avoiding erroneous reads. Capability may also be provided for sourcing data directly from the write buffer, or even bypassing the write buffer, to reduce the effect of pipeline stalls due to RAW hazards; further capability may also be provided so that only the last of multiple reads may be sourced to the core. Write-after-read control may also be provided to avoid false RAW hazard detection.

BRIEF DESCRIPTION OF THE DRAWINGS

FIG. 1b is a flow chart, in block form, of the instruction pipeline stages according to the superpipelined superscalar microprocessor of FIG. 1a.

FIG. 2 is an electrical diagram, in block form, of a processor system incorporating the microprocessor of FIG. 1a.

FIG. 8 is a map of the address valid bits of the cross-dependency field for a write buffer entry for one pipeline of the microprocessor of FIG. 1a relative to the address valid bits of the write buffer entries for the other pipeline of the microprocessor of FIG. 1a.

DETAILED DESCRIPTION OF THE PREFERRED EMBODIMENT

Figure 1A:
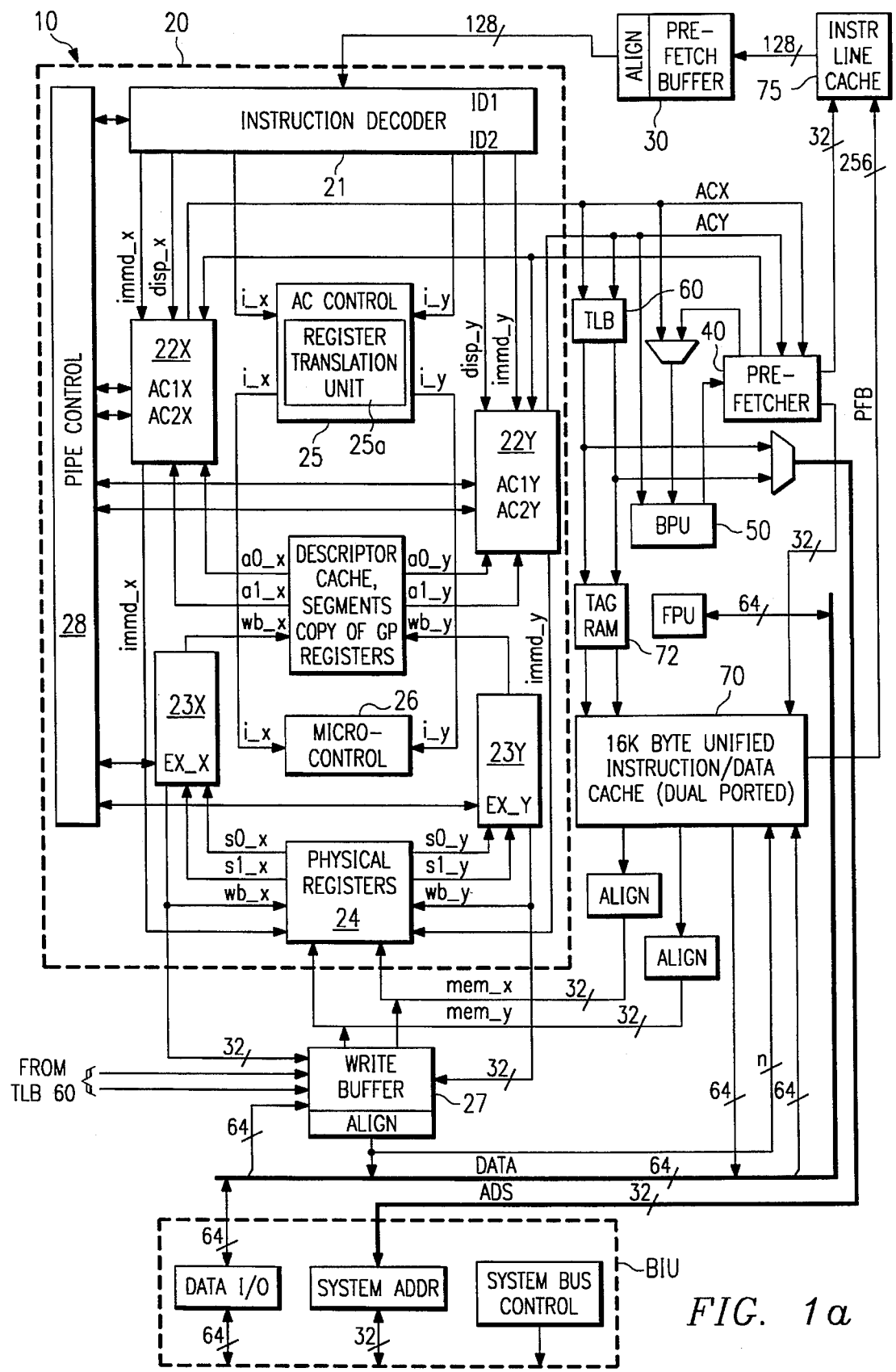
FIG. 1a is an electrical diagram, in block form, of a microprocessor within which the preferred embodiment of the invention is implemented.

The detailed description of an exemplary embodiment of the microprocessor of the present invention is organized as follows:

1. Exemplary processor system
2. Write buffer architecture and operation
3. Hazard detection and write buffer operation
4. Speculative execution and exception handling
5. Special write cycles from the write buffer
6. Conclusion This organizational table and the corresponding headings used in this detailed description, are provided for the convenience of reference only. Detailed description of conventional or known aspects of the microprocessor are omitted as to not obscure the description of the invention with unnecessary detail.

1. Exemplary Processor System

Figure 1B:
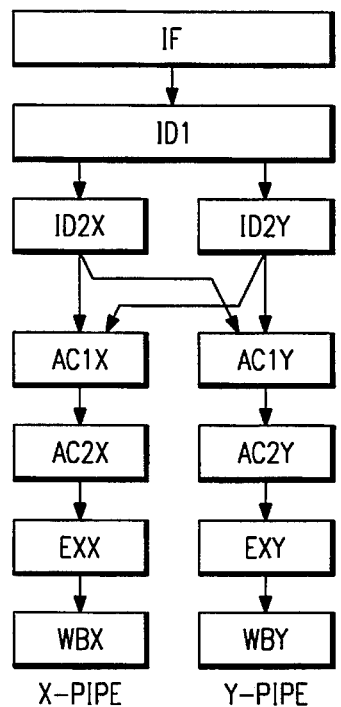
Figure 2:
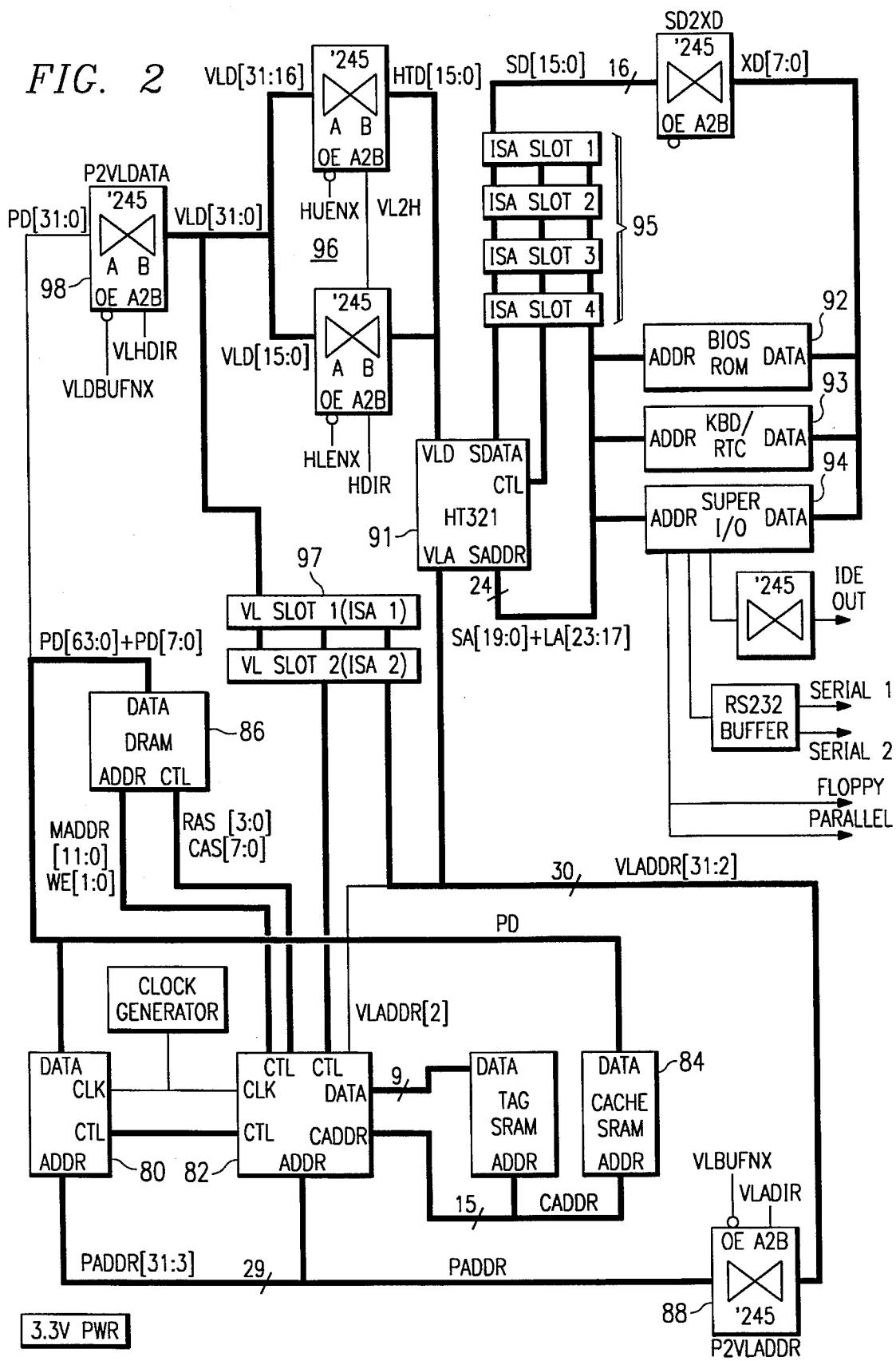

The exemplary processor system is shown in FIGS. 1a and 1b, and FIG. 2. FIGS. 1a and 1b respectively illustrate the basic functional blocks of the exemplary superscalar, superpipelined microprocessor along with the pipe stages of the two execution pipelines. FIG. 2 illustrates an exemplary processor system (motherboard) design using the microprocessor.

1.1 Microprocessor

Referring to FIG. 1a, the major sub-blocks of a microprocessor 10 include: (a) CPU core 20, (b) prefetch buffer 30, (c) prefetcher 40, (d) BPU (branch processing unit) 50, (e) TLB (translation lookaside buffer) 60, and (f) unified 16 Kbyte code/data cache 70, including TAG RAM 72. A 256 byte instruction line cache 75 provides a primary instruction cache to reduce instruction fetches to the unified cache, which operates as a secondary instruction cache. An onboard floating point unit (FPU) executes floating point instructions issued to it by the CPU core 20.

The microprocessor uses internal 32-bit address and 64-bit data buses ADS and DATA. A 256 bit (32 byte) prefetch bus PFB, corresponding to the 32 byte line size of the unified cache 70 and the instruction line cache 75, allows a full line of 32 instruction bytes to be transferred to the instruction line cache in a single clock. Interface to external 32 bit address and 64 bit data buses is through a bus interface unit (BIU).

The unified cache 70 is 4-way set associative (with a 4k set size), using a pseudo-LRU replacement algorithm, with writethrough and write-back modes. It is dual ported (through banking) to permit two memory accesses (data read, instruction fetch, or data write) per clock. The instruction line cache is a fully associative, lookaside implementation (relative to the unified cache), using an LRU replacement algorithm.

The FPU includes a load/store stage with 4-deep load and store queues, a conversion stage (32-bit to 80-bit extended format), and an execution stage. Loads are controlled by the CPU core 20, and cacheable stores are directed through the write buffers 27 (i.e., a write buffer is allocated for each floating point store operation).

The CPU core 20 is a superscalar design with two execution pipes X and Y. It includes an instruction decoder 21, address calculation units 22X and 22Y, execution units 23X and 23Y, and a register file 24 with 32 32-bit registers. An AC control unit 25 includes a register translation unit 25a with a register scoreboard and register renaming hardware. A microcontrol unit 26, including a microsequencer and microROM, provides execution control.

Writes from CPU core 20 are queued into twelve 32 bit write buffers 27—write buffer allocation is performed by the AC control unit 25. These write buffers provide an interface for writes to the unified cache—noncacheable writes go directly from the write buffers to external memory. The write buffer logic supports optional read sourcing and write gathering.

A pipe control unit 28 controls instruction flow through the execution pipes, including keeping the instructions in order until it is determined that an instruction will not cause an exception, squashing bubbles in the instruction stream, and flushing the execution pipes behind branches that are mispredicted and instructions that cause an exception. For each stage, the pipe control unit keeps track of which execution pipe contains the earliest instruction, provides a "stall" output, and receives a "delay" input.

Referring to FIG. 1b, the microprocessor has seven-stage X and Y execution pipelines: instruction fetch IF, two instruction decode stages ID1 and ID2, two address calculation stages AC1 and AC2, execution EX, and write-back WB. Note that the complex instruction decode ID and address calculation AC pipe stages are superpipelined.

The IF stage provides a continuous code stream into the CPU core 20. The prefetcher 40 fetches 16 bytes of instruction data into the prefetch buffer 30 from either the (primary) instruction line cache 75 or the (secondary) unified cache 70. BPU 50 is accessed with the prefetch address, and supplies target addresses to the prefetcher for predicted changes of flow, allowing the prefetcher to shift to a new code stream in one clock.

The decode stages ID1 and ID2 decode the variable length X86 instruction set. The instruction decoder 21 retrieves 16 bytes of instruction data from the prefetch buffer 30 each clock. In ID1, the length of two instructions is decoded (one each for the X and Y execution pipes) to obtain the X and Y instruction pointers—a corresponding X and Y bytes-used signal is sent back to the prefetch buffer (which then increments for the next 16 byte transfer). Also in ID1, certain instruction types are determined, such as changes of flow, and immediate and/or displacement operands are separated. The ID2 stage completes decoding the X and Y instructions, generating entry points for the microROM and decoding addressing modes and register fields.

During the ID stages, the optimum pipe for executing an instruction is determined, and the instruction is issued into that pipe. Pipe switching allows instructions to be switched from ID2X to AC1Y, and from ID2Y to AC1X. For the exemplary embodiment, certain instructions are issued only into the X pipeline: change of flow instructions, floating point instructions, and exclusive instructions. Exclusive instructions include: any instruction that may fault in the EX pipe stage and certain types of instructions such as protected mode segment loads, string instructions, special register access (control, debug, test), Multiply/Divide, Input/Output, PUSHA/POPA, and task switch. Exclusive instructions are able to use the resources of both pipes because they are issued alone from the ID stage (i.e., they are not paired with any other instruction). Except for these issue constraints, any instructions can be paired and issued into either the X or Y pipe.

The address calculation stages AC1 and AC2 calculate addresses for memory references and supply memory operands. The AC1 stage calculates two 32 bit linear (three operand) addresses per clock (four operand addresses, which are relatively infrequent, take two clocks). During this pipe stage, data dependencies are also checked and resolved using the register translation unit 25a (register scoreboard and register renaming hardware)—the 32 physical registers 24 are used to map the 8 general purpose programmer visible logical registers defined in the X86 architecture (EAX, EBX, ECX, EDX, EDI, ESI, EBP, ESP). During the AC2 stage, the register file 24 and the unified cache 70 are accessed with the physical address (for cache hits, cache access time for the dual ported unified cache is the same as that of a register, effectively extending the register set)— the physical address is either the linear address, or if address translation is enabled, a translated address generated by the TLB 60.

Translated addresses are generated by the TLB from the linear address using information from page tables in memory and workspace control registers on chip. The unified cache is virtually indexed and physically tagged to permit, when address translation is enabled, set selection with the untranslated address (available at the end of AC1) and, for each set, tag comparison with the translated address from the TLB (available early in AC2). Checks for any segmentation and/or address translation violations are also performed in AC2.

Instructions are kept in program order until it is determined that they will not cause an exception. For most instructions, this determination is made during or before AC2— floating point instructions and certain exclusive instructions may cause exceptions during execution. Instructions are passed in order from AC2 to EX (or in the case of floating point instructions, to the FPU)—because integer instructions that may still cause an exception in EX are designated exclusive, and therefore are issued alone into both execution pipes, handling exceptions in order is ensured.

The execution stages EXX and EXY perform the operations defined by the instruction. Instructions spend a variable number of clocks in EX, i.e., they are allowed to execute out of order (out of order completion). Both EX stages include adder, logical, and shifter functional units, and in addition, the EXX stage contains multiply/divide hardware.

The write back stage WB updates the register file 24, condition codes, and other parts of the machine state with the results of the previously executed instruction.

Figure 3:
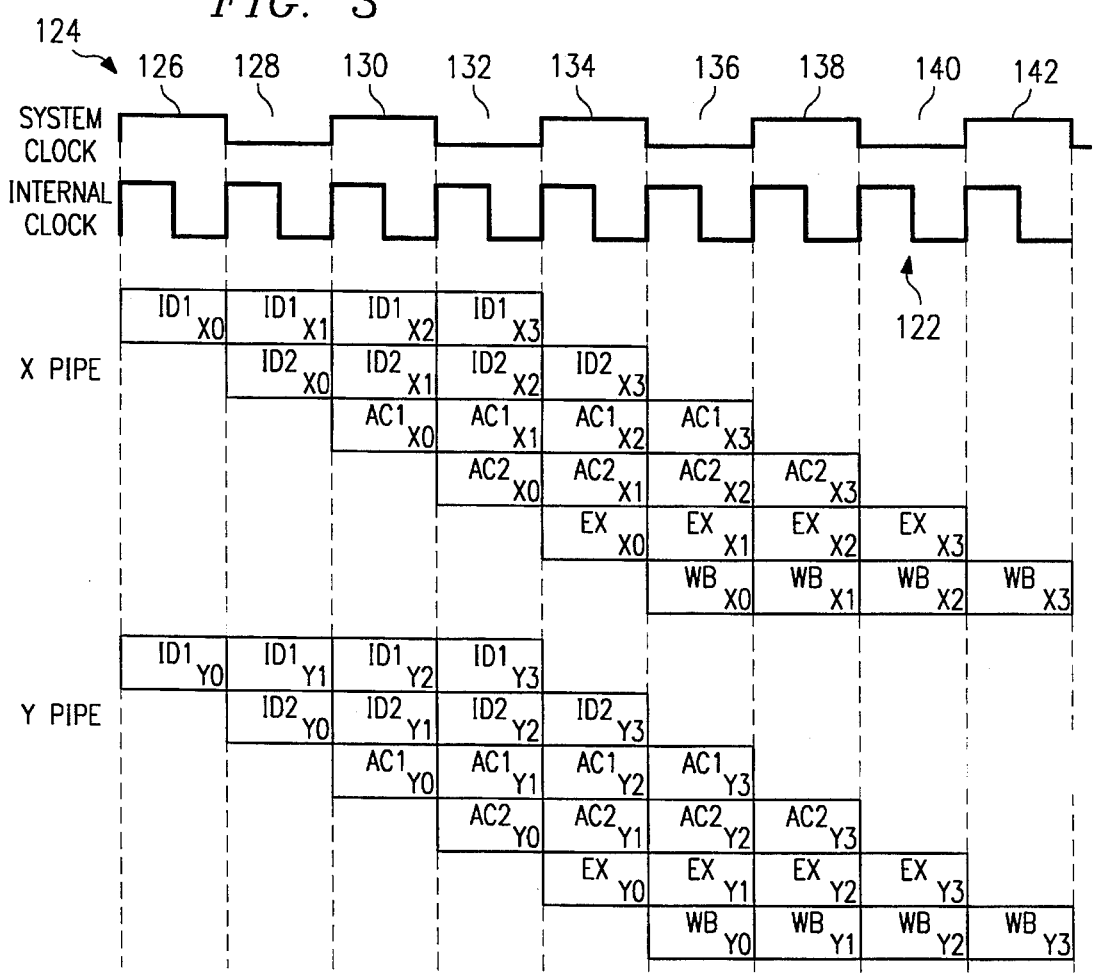
FIG. 3 is a timing diagram illustrating the execution of instructions in the pipeline stages of FIG. 1b.

FIG. 3 illustrates an example of the performance of eight instructions through the pipeline, showing the overlapping execution of the instructions. In the preferred embodiment, the internal operation of microprocessor 10 is synchronous with internal clock signal 122 at a frequency that is a multiple of that of external system clock signal 124. In the example of FIG. 3, internal clock signal 122 is at twice the frequency of system clock signal 124. During first internal clock cycle 126, first stage instruction decode stages ID1 operate on respective instructions X0 and Y0. During second internal clock cycle 128, instructions X0 and Y0 have proceeded to second stage instruction decode stages ID2, and new instructions X1 and Y1 are in first stage instruction decode units ID1. During third internal clock cycle 130, instructions X2, Y2 are in first stage decode stages ID1, instructions X1, Y1 are in second stage instruction decode stages ID2, and instructions X0, Y0 are in first address calculation units AC1. During internal clock cycle 132, instructions X3, Y3 are in first stage instruction decode stages ID1, instructions X2, Y2 are in second stage instruction decode stages ID2, instructions X1, Y1 are in the first address calculation stages AC1, and instructions X0 and Y0 are in second address calculation stages AC2.

As is evident from this description, successive instructions continue to flow sequentially through the stages of the X and Y pipelines. As shown in clock cycles 134, 140, the execution portion of each instruction is performed on sequential clock cycles. This is a major advantage of a pipelined architecture, in that the number of instructions completed per clock is increased, without reducing the execution time of an individual instruction. Consequently a greater instruction throughput is achieved with greater demands on the speed of the hardware.

The instruction flow shown in FIG. 3 is the optimum case. As shown, no stage requires more than one clock cycle. In an actual machine though, one or more stages may require additional clock cycles to complete thereby changing the flow of instructions through the other pipe stages. Furthermore, the flow of instructions through one pipeline may be dependent upon the flow of instructions through the other pipeline.

The microprocessor 10 supports speculative execution in the case of both branch and floating point instructions. That is, instructions following either a floating point instruction, or a branch for which the BPU 50 has predicted the direction (taken or not taken), are speculatively allowed to proceed in the execution pipelines and complete execution. If a floating point instruction faults (which may be tens or even hundreds of clocks after being issued to the FPU) or if a branch is mispredicted (which will not be known until the EX or WB stage for the branch), then the execution pipeline must be repaired to the point of the faulting or mispredicted instruction (i.e., the execution pipeline is flushed behind that instruction), and instruction fetch restarted.

Pipeline repair is accomplished by creating checkpoints of the machine state at each pipe stage as a floating point or predicted branch instruction enters that stage. For these checkpointed instructions, all resources (programmer visible registers, instruction pointer, condition code register) that can be modified by succeeding speculatively issued instructions are checkpointed. If a checkpointed floating point instruction faults or a checkpointed branch is mispredicted, the execution pipeline is flushed behind the checkpointed instruction—for floating point instructions, this will typically mean flushing the entire execution pipeline, while for a mispredicted branch there may be a paired instruction in EX and two instructions in WB that would be allowed to complete.

For the exemplary microprocessor 10, the principle constraints on the degree of speculation are: (a) speculative execution is allowed for only up to four floating point or branch instructions at a time (i.e., the speculation level is maximum 4), and (b) a write or floating point store will not complete to the cache or external memory until the associated branch or floating point instruction has been resolved (i.e., the prediction is correct, or floating point instruction does not fault).

1.2 System

Referring to FIG. 2, for the exemplary embodiment, microprocessor 80 is used in a processor system that includes a single chip memory and bus controller 82. The memory/bus controller 82 provides the interface between the microprocessor and the external memory subsystem—level two cache 84 and main memory 86—controlling data movement over the 64 bit processor data bus PD (the data path is external to the controller which reduces its pin count and cost).

Controller 82 interfaces directly to the 32-bit address bus PADDR, and includes a one bit wide data port (not shown) for reading and writing registers within the controller. A bidirectional isolation buffer 88 provides an address interface between microprocessor 80 and VL and ISA buses.

Controller 82 provides control for the VL and ISA bus interface. A VL/ISA interface chip 91 (such as an HT321) provides standard interfaces to a 32 bit VL bus and a 16 bit ISA bus. The ISA bus interfaces to BIOS 92, keyboard controller 93, and I/O chip 94, as well as standard ISA slots 95. The interface chip 91 interfaces to the 32 bit VL bus through a bidirectional $^{32}/_{16}$ multiplexer 96 formed by dual high/low word [31:16]/[15:0] isolation buffers. The VL bus interfaces to standard VL slots 97, and through a bidirectional isolation buffer 98 to the low double word [31:0] of the 64 bit processor data bus.

2. Write buffer architecture and operation

Figure 4:
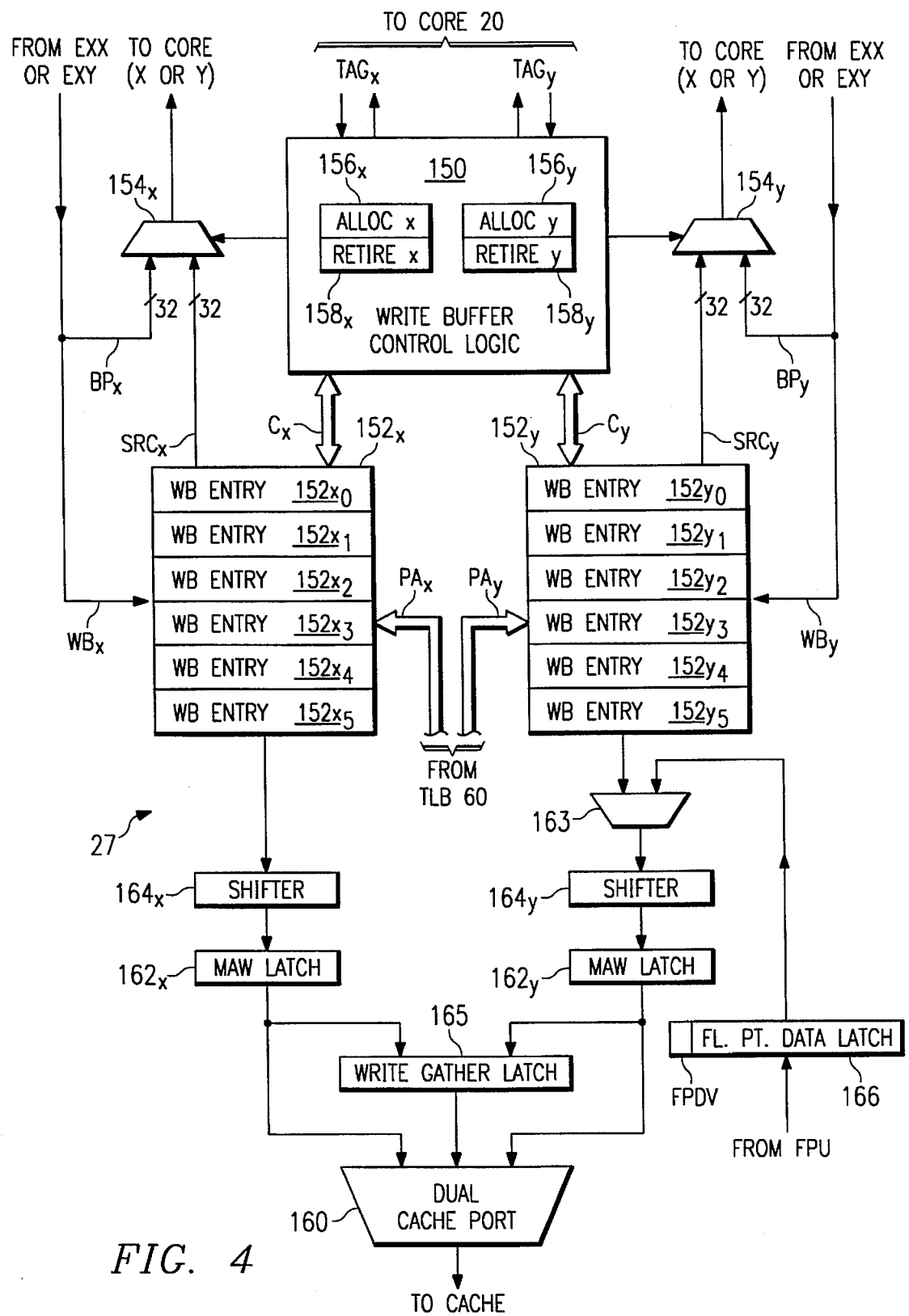
FIG. 4 is an electrical diagram, in block form, of the write buffer in the microprocessor of FIG. 1a according to the preferred embodiment of the invention.

As shown in FIG. 1a, write buffer 27 is logically located at the output of core 20, and is operatively connected to core 20 by writeback buses WB_x, WB_y to receive data therefrom. Write buffer 27 is also operatively connected to TLB 60 to receive physical addresses therefrom via address buses PAx, PAy (FIG. 4). The output of write buffer 27 is presented to unified cache 70 by way of dual cache port 160, and is also presented to memory data bus DATA. Cache port 160 presents data, address and control lines to unified cache 70 in the conventional manner; according to the preferred embodiment of the invention, the number of lines between cache port 160 and unified cache 70 is sufficient to support two simultaneous write requests.

As will be made further apparent hereinbelow, the function of write buffer 27 is to receive address and data information from core 20 that are to be written to memory, rather than to one of the registers in register file 24; the address and data information stored in write buffer 27 can then be later written to memory at such time as the cache and memory subsystems are not otherwise busy in a higher priority operation. As a result, write buffer 27 allows for core 20 to rapidly perform a memory write operation (from its viewpoint) and go on to the next instruction in the pipeline, without disrupting memory read operations and without requiring wait states on the part of core 20 to accomplish the memory write. Further, the memory write operation performed by core 20 to write buffer 27 requires the same write cycle time, regardless of whether the memory location is in unified cache 70 or in main memory 86.

Referring now to FIG. 4, the detailed construction and operation of write buffer 27 according to the preferred embodiment of the invention will now be described. It is to be understood that the example of write buffer 27 described hereinbelow, while especially advantageous in the superpipelined superscalar architecture of microprocessor 10, can also provide significant performance and other advantages when utilized in microprocessors of different architecture.

According to the preferred embodiment of the invention, write buffer 27 contains twelve entries $152x_0$ through $152x_5$, $152y_0$ through $152y_5$, organized into two sections 152x, 152y. This split organization of write buffer 27 in this example is preferred for purposes of layout and communication efficiency with the superscalar architecture of microprocessor 10, with write buffer sections 152x, 152y associated with the X and Y pipelines, respectively, of core 20. Alternatively, write buffer 27 could be organized as a single bank, with each entry accessible by either of the X and Y pipelines of core 20.

Write buffer 27 further includes write buffer control logic 150, which is combinatorial or sequential logic specifically designed to control write buffer 27 and its interface with core 20 in the manner described herein. It is contemplated that one of ordinary skill in the art having reference to this specification will be readily able to realize logic for performing these functions, and as such write buffer control logic 150 is shown in FIG. 4 in block form.

Figure 5:
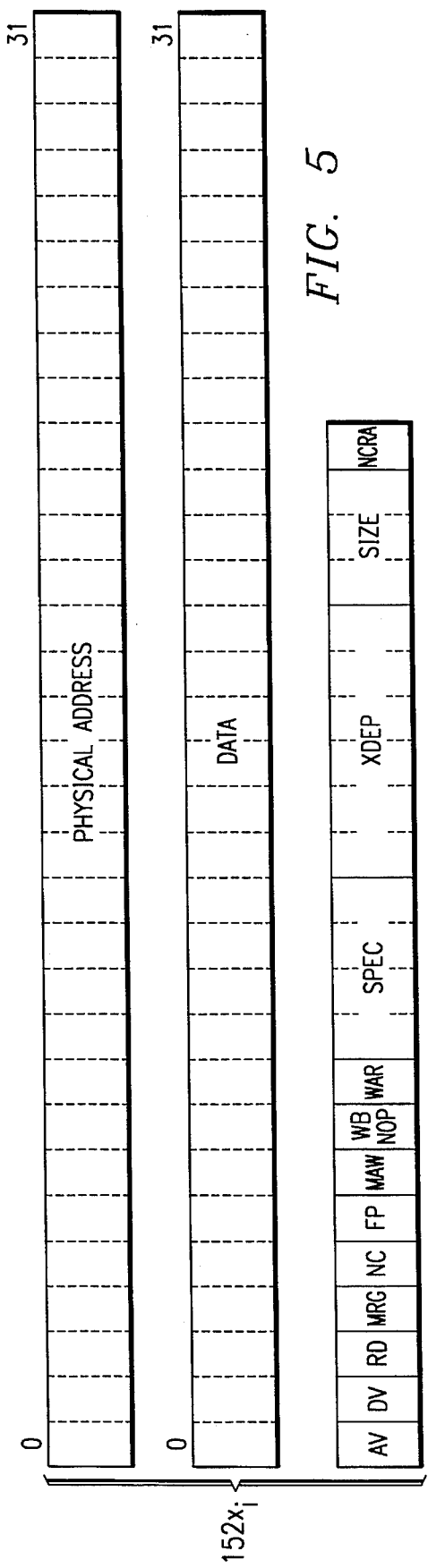
FIG. 5 is a representation of the contents of one of the entries in the write buffer of FIG. 4.

Referring now to FIG. 5, the contents of a single entry $152x_i$ in write buffer section 152x will now be described; it is to be understood, of course, that each entry $152y_i$ of write buffer section 152y will be similarly constructed according to this preferred embodiment of the invention. Each entry $152x_i$ contains an address portion, a data portion, and a control portion. In addition, each entry 152 is identified by a four bit tag value (not shown), as four bits are sufficient to uniquely identify each of the twelve entries 152 in write buffer 27. The tag is used by core 20 to address a specific entry 152 so as to write data thereto (or source data therefrom) during the execution stage EX and writeback stage WB of the pipeline. By use of the four-bit tag, core 20 does not need to maintain the physical memory address of the write through the remainder of the pipeline.

For the thirty-two bit integer architecture of microprocessor 10, each entry $152x_i$ includes thirty-two bits for the storage of a physical memory address (received from TLB 60 via physical address bus PAx), and thirty-two bits for storage of a four-byte data word. Also according to this preferred embodiment of the invention, each entry $152x_i$ further includes twenty-three various control bits, defined as noted below in Table A. These control bits are utilized by write buffer control logic 150 to control the allocation and issuing of entries 152. In addition, other portions of microprocessor 10, such as control logic in unified cache 70, are also able to access these control bits as necessary to perform their particular functions. The specific function of each control bit will be described in detail hereinbelow relative to the operation of write buffer 27.

Table A

AV: address valid; the entry contains a valid address

DV: data valid; the entry contains valid data

RD readable; the entry is the last write in the pipeline to its physical address MRG: mergeable; the entry is contiguous and non-overlapping to the preceding write buffer entry NC: non-cacheable write FP: the entry corresponds to floating point data MAW: misaligned write WBNOP: write buffer no-op WAR : write-after-read; the entry is a write occurring later in program order than a simultaneous read in the other pipeline SPEC: four bit field indicating the order of speculation for the entry XDEP: cross-dependency map of write buffer section 152y SIZE: size, in number of bytes, of data to be written NCRA: non-cacheable read has been previously allocated Write buffer section 152x receives the results of either execution stage EXX of the X pipeline or execution stage EXY of the Y pipeline via writeback bus WB_x driven by core 20; similarly, write buffer section 152y receives the results of either execution stage EXX of the X pipeline or execution stage EXY of the Y pipeline via writeback bus WB_y.

Write buffer sections 152x, 152y present their contents (both address and data sections) to cache port 160, for example, via circuitry for properly formatting the data. As shown in FIG. 4, write buffer section 152x presents its data to barrel shifter 164x, which in turn presents its output to misaligned write latch 162x. As will be described in further detail hereinbelow, misaligned write latch 162x allows for storage of the data from write buffer section 152x for a second write to cache port 160, which is performed according to the present invention in the event that write to memory overlaps an eight-byte boundary. Misaligned write latch 162x presents its output directly to cache port 160, and also to write gather latch 165; write gather latch 165, as will be described in further detail hereinbelow, serves to gather data from multiple write buffer entries 152 for a single write to cache port 160, in the event that the physical addresses of the multiple writes are in the same eight-byte group.

Write buffer section 152y presents its output to one input of multiplexer 163, which receives the output of floating point data latch 166 at its other input; as will be described hereinbelow, floating point data latch 166 contains the output from the FPU, and provides sixty-four bit floating point data storage for a memory write corresponding to one of write buffer entries 152. Multiplexer 163 is controlled by write buffer control logic 150 and by the cache control logic for unified cache 70, to select the appropriate input for presentation at its output, as will be described hereinbelow. The output of multiplexer 163 is presented to shifter 164y, and in turn to misaligned write latch 162y, in similar manner as is the output of write buffer section 152x described above. The output of misaligned write latch 162y is also similarly connected directly to cache port 160 and also to write gather latch 165.

While only a single cache port 160 is schematically illustrated in FIG. 4 for simplicity of explanation, as described hereinabove, cache port 160 according to this embodiment of the invention is a dual cache port, enabling presentation of two write requests simultaneously. In addition, write buffer 27 also communicates data directly to data bus DATA. As such, according to this embodiment of the invention, the connections to cache port 160 shown in FIG. 4 will be duplicated to provide the second simultaneous write to cache port 160, and will also be provided directly to data bus DATA to effect a memory write in the event that cache control requires a write to main memory 86.

Also according to the preferred embodiment of the invention, write buffer 27 is capable of sourcing data directly from its entries 152 to core 20 by way of source buses SRCx, SRCy, under the control of write buffer control logic 150 which controls multiplexers 154x, 154y. The output of multiplexer 154x may be applied to either of the X or Y pipelines, under the control of pipeline control 28, via buses mem_x, mem_y to physical registers 24; similarly, the output of multiplexer 154y may be applied to either of the X or Y pipelines via buses mem_x, mem_y. In addition, writeback buses WB_x, WB_y are also connected to multiplexers 154x, 154y via bypass buses BP_x, BP_y, respectively, so that memory bypassing of write buffer 27 is facilitated as will be described hereinbelow.

As noted above, microprocessor 10 includes an on-chip floating point unit (FPU) for performing floating point operations. As noted above, the results of calculations performed by the FPU are represented by sixty-four bit data words. According to this preferred embodiment of the invention, efficiency is obtained by limiting the data portions of write buffer entries 152 to thirty-two bits, and by providing sixty-four bit floating point data latch 166 for receiving data from the FPU. Floating point data latch 166 further includes control bit FPDV which indicates, when set, that the contents of floating point data latch 166 contain valid data. The address portion of one of write buffer entries 152 will contain the memory address to which the results from the FPU, stored in floating point data latch 166, are to be written; this write buffer entry 152 will have its FP control bit set, indicating that its data portion will not contain valid data, but that its corresponding data will instead be present in floating point data latch 166.

Alternatively, of course, floating point data write buffering could be obtained by providing a sixty-four bit data portion for each write buffer entry 152. According to this embodiment of the invention, however, pre-cache write buffering of sixty-four bit floating point data is provided but with significant layout and chip area inefficiency. This inefficiency is obtained by not requiring each write buffer entry 152 to have a sixty-four bit data portion; instead, floating point data latch 166 provides sixty-four bit capability for each of entry 152 in write buffer 27. It is contemplated that, for most applications, the frequency at which floating point data is provided by the FPU is on the same order at which the floating point data will be retired from floating point data latch 166 (i.e., written to cache or to memory). This allows the single floating point data latch 166 shown in FIG. 4 to provide adequate buffering. Of course, in the alternative, multiple floating point data latches 166 could be provided in microprocessor 10 if additional buffering is desired.

The operation of write buffer 27 according to the preferred embodiment of the invention will now be described in detail. This operation is under the control of write buffer control logic 150, which is combinatorial or sequential logic arranged so as to perform the functions described hereinbelow. As noted above, it is contemplated that one of ordinary skill in the art will be readily able to implement such logic to accomplish the functionality of write buffer control logic 150 based on the following description.

Specifically, according to this embodiment of the invention, write buffer control logic 150 includes X and Y allocation pointers 156x, 156y, respectively, and X and Y retire pointers 158x, 158y, respectively; pointers 156, 158 will keep track of the entries 152 in write buffer 27 next to be allocated or retired, respectively. Accordingly, sections 152x, 152y of write buffer 27 each operate as a circular buffer for purposes of allocation and retiring, and as a file of addressable registers for purposes of issuing data. Alternatively, write buffer 27 may be implemented as a fully associative primary data cache, if desired.

In general, upon second address calculation stages AC2 determining that a memory write will be performed during the execution of an instruction, one of write buffer entries 152 will be "allocated" at such time as the physical address is calculated in this stage, such that the physical address is stored in the address portion of an entry 152 and its address valid control bit AV and other appropriate control bits are set. After execution of the instruction, and during the writeback stages, core 20 writes the result in the data portion of that write buffer entry 152 to "issue" the write buffer entry, setting the data valid control bit DV. The write buffer entry 152 is "retired" in an asynchronous manner, in program order, by interrogating the AV and DV bits of a selected entry 152 and, if both are set, by causing the contents of the address and data portions of the entry 152 to appear on the cache port 160 or the system bus, as the case may be.

2.1 Allocation of write buffer entries

Figure 6:
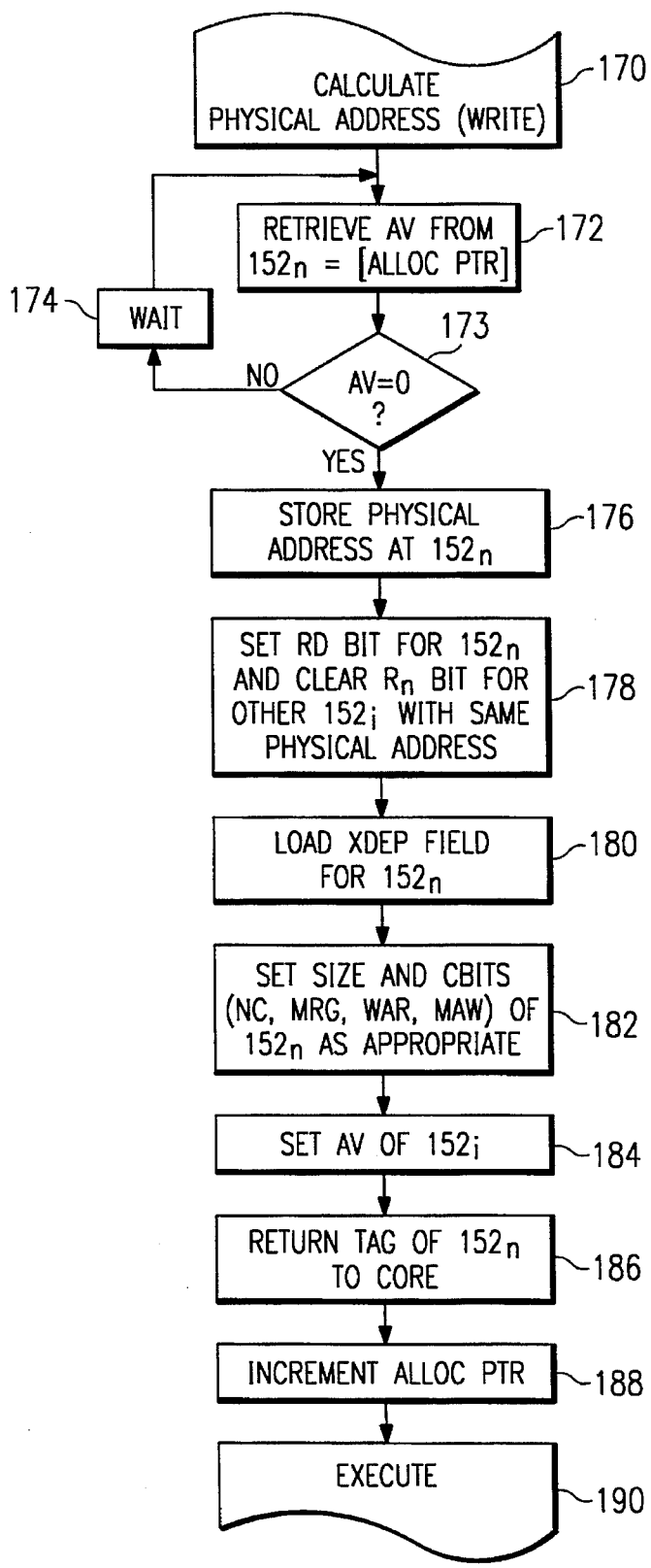
FIG. 6 is a flow chart illustrating the allocation of a write buffer entry during the address calculation stage AC2 of the pipeline of FIG. 1b.

Referring now to FIG. 6, the process for allocation of write buffer entries 152 according to the preferred embodiment of the invention will now be described in detail. In this embodiment of the invention, the allocation process is performed as part of the second address calculation stages AC2 in both the X and Y pipelines. As shown by process 170 of FIG. 6, the allocation process is initiated upon the calculation of a physical memory address to which results of an instruction are to be written (i.e., a memory write).

For ease of explanation, the sequence of FIG. 6 will be described relative to one of the sections 152x, 152y of write buffer 27. The allocation of write buffer entries 152 in the opposite section of write buffer 27 will be identical to that shown in FIG. 6.

Once the physical address is calculated, process 172 retrieves address value control bit AV from the write buffer entry 152 to which the allocation pointer 156 is pointing. Each side of write buffer 27 according to this embodiment of the invention operates as a circular buffer, with allocation pointers 156x, 156y indicating the next write buffer entry 152 to be allocated for the X and Y pipelines, respectively; for purposes of this description, the write buffer entry 152 to which the appropriate allocation pointer 156x, 156y points will be referred to as $152_n$. Decision 173 determines if address valid control bit AV is set (1) or cleared (0). If address valid control bit AV is already set, write buffer entry $152_n$ is already allocated or pending, as it has a valid address already stored therein. As such, entry $152_n$ is not available to be allocated at this time, causing wait state 174 to be entered, followed by repeated retrieval and checking of address valid control bit AV for the next entry $152_{n+1}$ in process 172 and decision 173.

If decision 173 determines that address valid control bit AV for entry $152_n$ is cleared, entry $152_n$ is available for allocation as it is not already allocated or pending. In this case, process 176 stores the physical address calculated in process 170 into the address portion of entry $152_n$.

The specific order of processes 176 through 188 shown in

FIG. 6 is by way of example only. It is contemplated that these processes may be performed in any order deemed advantageous or suitable for the specific realization by one of ordinary skill in the art.

2.1.1 Read-after-multiple-write hazard handling

According to this embodiment of the invention, certain data dependencies are detected and handled relative to write buffer accesses. As is well known in the art, data dependencies are one type of hazard in a pipelined architecture microprocessor, that can cause errors in the program result. These dependencies are even more prevalent in the superscalar superpipelined architecture of microprocessor 10, particularly where certain instructions may be executed out of program order for performance improvement. Specifically, as noted hereinabove relative to FIG. 4, and as will be described in further detail hereinbelow, write buffer 27 can source data to core 20 via buses SRCx, SRCy prior to retiring of an entry if the data is needed for a later instruction in the pipeline. Readable control bit RD in write buffer entries 152 assists the handling of a special type of read-after-write (RAW) dependency, in which the pipeline contains a read of a physical memory address that is to be performed after multiple writes to the same physical address, and prior to the retiring of the write buffer entries 152 assigned to this address. According to the preferred embodiment of the invention, only write buffer entries 152 having their readable control bit RD set can be used to source data to core 20 via buses SRCx, SRCy. This avoids the possibility that incorrect data may be sourced to core 20 from a completed earlier write, instead of from a later allocated but not yet executed write operation to the same physical address.

In process 178, write buffer control logic 150 examines the address fields of each previously allocated write buffer entry 152 to determine if any match the physical address which is to be allocated to entry $152_n$. According to the preferred embodiment of the invention, considering that the size of each read or write operation can be as many as eight bytes (if floating point data is to be written; four bytes for integer data in this embodiment of the invention) and that each physical address corresponds to a single byte, not only must the physical address values be compared in process 178 but the memory span of each operation must be considered. Because of this arrangement, write operations having different physical addresses may overlap the same byte, depending upon the size of their operations.

Figure 7:
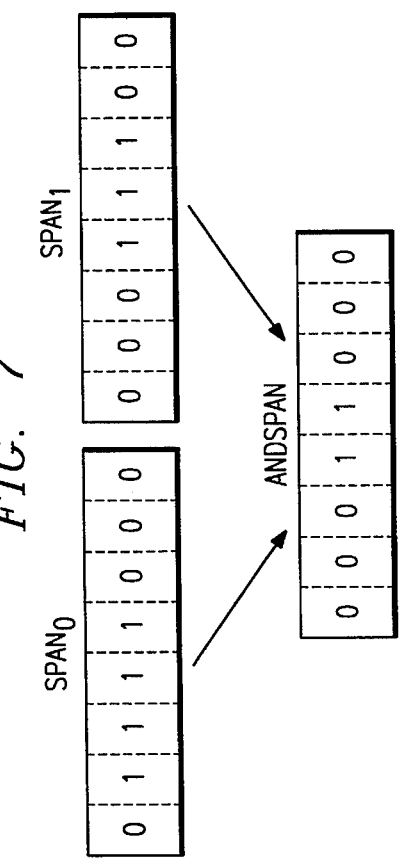
FIG. 7 is a representation of the physical address comparison process in the allocation of FIG. 6.

Referring now to FIG. 7, the method by which the physical addresses of different memory access instructions are compared in process 178 according to the preferred embodiment of the invention will be described in detail. To compare the write spans of two write operations, pipeline control logic 28 loads a first span map $SPAN_0$ with a bit map in which bits are set that correspond to the relative location of bytes to which the write operation of the older write instruction will operate, and loads a second span map $SPAN_1$ with a bit map having set bits corresponding to the location of bytes to which the write operation of the newer write instruction will operate. The absolute position of the set bits in span map is unimportant, so long as the end bits of span maps $SPAN_0$, $SPAN_1$ correspond to the same physical byte address. FIG. 7 illustrates an example of span maps $SPAN_0$, $SPAN_1$ for two exemplary write operations. Process 178 next performs a bit-by-bit logical AND of span maps $SPAN_0$ and $SPAN_1$, producing map ANDS PAN which indicates with set bits indicating the location of any bytes which will be written by both of the write operations. In the example of FIG. 7, two of the bits are set in map ANDSPAN, indicating that the two exemplary write operations both are writing to two bytes.

Process 178 then performs a logical OR of the bits in map ANDSPAN to determine if any bits are set therein. Readable control bit for entry $152_n$ will be set (regardless if any matching entries are found) and readable control bit RD will be cleared for any previously allocated write buffer entry 152 that causes the result of the logical OR of the bits in map ANDSPAN to be true. Accordingly, and as will be described hereinbelow, if a later read of write buffer 27 is to be performed (i.e., sourcing of data from write buffer 27 prior to retiring), only last-written write buffer entry $152_n$ will have its readable control bit RD set and thus will be able to present its data to core 20 via source bus SRCx, SRCy. Those write buffer entries 152 having valid data (data valid control bit DV set) but having their readable control bit RD clear are prevented by write buffer control logic 150 from sourcing their data to buses SRCx, SRCy.

2.1.2 Cross-dependency and retiring in program order

As noted above, write buffer entries 152 must be retired (i.e., written to unified cache 70 or main memory 86) in program order. For those implementations of the present invention where only a single bank of write buffer entries 152 are used, program order is readily maintained by way of a single retire pointer 158. However, because of the superscalar architecture of microprocessor 10, and in order to obtain layout efficiency in the realization of write buffer 27, as noted above this example of the invention splits write buffer entries 152 into two groups, one for each of the X and Y pipelines, each having their own retire pointers 158x, 158y, respectively. This preferred embodiment of the invention provides a technique for ensuring retirement in program order between X section write buffer entries 152x and Y section write buffer entries 152y.

Figure 8:
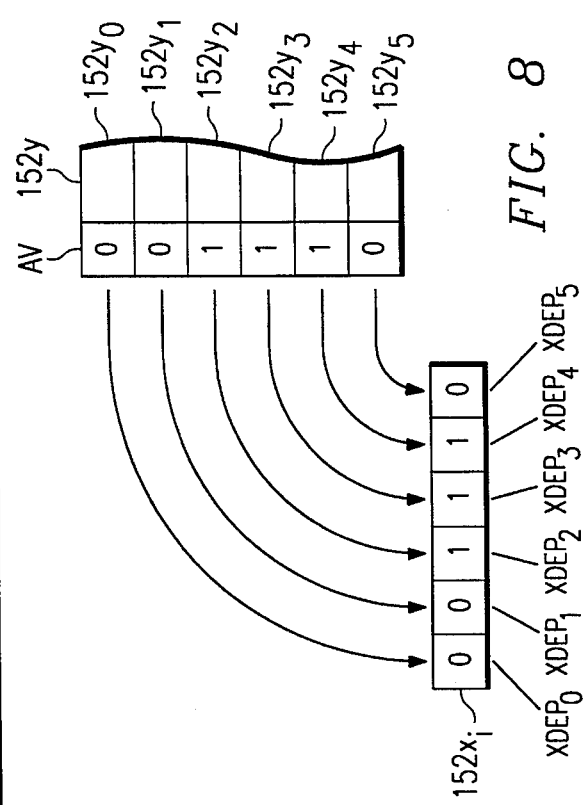

Referring now to FIG. 8, a map of cross-dependency control bits XDEP for a selected write buffer entry $152x_i$, at the time of its allocation, is illustrated. As shown in FIG. 8, each write buffer entry $152x_i$ in the X portion of write buffer 27 has six cross-dependency control bits $XDEP_0$ through $XDEP_5$, each bit corresponding to one of the write buffer entries $152y_i$ in the Y section 152y of write buffer 27; similarly (and not shown in FIG. 8), each write buffer entry $152y_i$ will have six cross-dependency control bits $XDEP_0$ through $XDEP_5$, one for each of the write buffer entries $152x_i$ in the X section 152x of write buffer 27. As illustrated in FIG. 8, the contents of each cross-dependency bit XDEP for write buffer entry $152x_i$ corresponds to the state of address valid control bit AV for a corresponding write buffer entry $152y_i$ in the Y section 152y of write buffer 27, at the time of allocation.

Process 180 in the allocation process of FIG. 6 loads cross-dependency control bits $XDEP_0$ through $XDEP_5$ for write buffer entry $152_n$ that is currently being allocated, with the state of the address valid control bits AV for the six write buffer entries $152y_i$ in the Y section 152y of write buffer 27 at the time of allocation. As will be described in further detail hereinbelow, as each write buffer entry 152 is retired, its corresponding cross-dependency control bit XDEP in each of the write buffer entries 152 in the opposite portion of write buffer 27 is cleared. Further, after a write buffer entry 152 has its cross-dependency control bits XDEP set in process 180 of the allocation sequence, no additional setting of any of its own cross-dependency control bits XDEP can occur.

Program order is thus maintained by requiring that, in order to retire a write buffer entry 152, all six of its cross-dependency control bits $XDEP_0$ through $XDEP_5$ must be cleared (i.e., equal to 0). Accordingly, the setting of cross-dependency control bits XDEP in process 180 takes a "snapshot" of those write buffer entries 152 in the opposite portion of write buffer 27 that are previously allocated (i.e., ahead of the allocated write buffer entry 152$_n$ in the program sequence). The combination of the cross-dependency control bits XDEP and retire pointers 158x, 158y ensure that write buffer entries 152 are retired in program order.

In similar manner, as will be described in detail hereinbelow, microprocessor 10 may include provisions for performing non-cacheable reads from main memory 86, which must be performed in program order. The presence of a previously allocated non-cacheable read is indicated for each write entry by non-cacheable read allocation control bit NCRA being set; upon execution of the non-cacheable read, control bit NCRA is cleared for all write buffer entries 152. The setting and clearing of non-cacheable read allocation control bit NCRA is performed in the same manner as cross-dependency control bits XDEP described hereinabove, to ensure that the non-cacheable read is performed in the proper program order.

2.1.3 Completion of allocation process

Process 182 is then performed in the allocation of write buffer entry 152$_n$, in which certain control bits in write buffer entry 152$_n$ are set according to the specific attributes of the memory write to be accomplished thereto. Write size control bits SIZE are set with the number of bytes of data (up to eight bytes, thus requiring three write size control bits SIZE) that are to be written to write buffer entry 152$_n$, as indicated in the instruction.

Others of the control bits in write buffer entry 152$_n$ are also set in process 182 to control the operation of microprocessor 10 in the use of write buffer entry 152$_n$. While the specific control effected in this embodiment of the invention based upon the state of these bits will be described in detail hereinbelow, the following is a summary of the nature of these control bits. Non-cacheable write control bit NC is set if the memory write operation is to be non-cacheable. Mergeable control bit MRG is set for write buffer entry 152$_n$ if the physical memory locations corresponding thereto are contiguous and non-overlapping with the memory locations corresponding to a previously allocated write buffer entry 152$_i$, such that a gathered write operation may be performed. Write-after-read control bit WAR is set if the write operation to write buffer entry 152$_n$ is to be performed after a simultaneous read in the other pipeline. Misaligned write control bit MAW is set if the length of the data to be written to the physical address stored in write buffer entry 152$_n$ crosses an eight-byte boundary (in which case two write cycles will be required to retire write buffer entry 152$_n$). Non-cacheable read allocation control bit NCRA is set if a non-cacheable read has previously been allocated and not yet performed.

Once the storing of the physical address and the setting of the control bits in write buffer entry 152$_n$ is complete, address valid control bit AV for write buffer entry 152$_i$ is set in process 184. In addition, if not previously cleared by a previous retire operation, data valid control bit DV is cleared at this time. The setting of address valid control bit AV indicates the allocation of write buffer entry 152$_n$ to subsequent operations, including the setting of cross-dependency control bits XDEP upon the allocation of a write buffer entry 152 in the opposite section of write buffer 27.

In process 186, write buffer control logic 150 returns the tag value of now-allocated write buffer entry 152$_n$ to core 20. Core 20 then uses this four bit tag value in its execution of the instruction, rather than the full thirty-two bit physical address value calculated in process 170. The use of the shorter tag value facilitates the execution of the instruction, and thus improves the performance of microprocessor 10.

The allocation sequence is completed in process 188, in which allocation pointer 156x, 156y (depending upon whether write buffer entry 152$_n$ is in the X or Y sections 152x, 152y of write buffer 27) is incremented to point to the next write buffer entry 152 to be allocated. Control then passes to process 190, which is the associated execution stage EX in the pipeline, if the instruction associated with the write is not prohibited from moving forward in the pipeline for some other reason.

2.2 Issuing of data to write buffer entries

Figure 9:
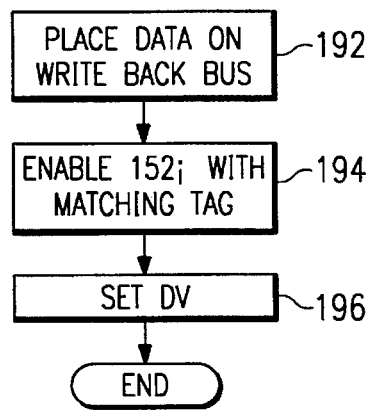
FIG. 9 is a flow chart illustrating the issuing of a write buffer entry according to the preferred embodiment of the invention.

Referring now to FIG. 9, the process of issuing data to write buffer entries 152 will be described in detail relative to a selected write buffer entry 152$_i$. As noted above, the issue of data to write buffer 27 is performed by core 20 after completion of the execution stage EX of the instruction, and during one of writeback stages WB depending upon whether operation is in the X or the Y pipeline.

The issue sequence begins with process 192, in which core 20 places the data to be written to write buffer 27 on the appropriate one of writeback buses WB_x, WB_y, depending upon which of the X or Y pipelines is executing the instruction. Core 20 is also communicating the tag of the destination write buffer entry 152 to write buffer control logic 150. Write buffer control logic 150 then enables write buffer entry 152$_i$, which is the one of write buffer entries 152 associated with the presented tag value, to latch in the data presented on its associated writeback bus WB_x, WB_y, in process 194. Once the storage or latching of the data in write buffer entry 152$_i$ is complete, data valid control bit DV is set in process 196, ending the issuing sequence.

Once write buffer entry 152$_i$ has both its address valid control bit AV and also its data valid control bit DV set, write buffer entry 152$_i$ is in its "pending" state, and may be retired. As noted above, the retiring of a write buffer entry 152 is accomplished on an asynchronous basis, under the control of cache logic used to operate unified cache 70, such that the writing of the contents of write buffer entries 152 to unified cache 70 or main memory 86 occurs on an as available basis, and does not interrupt or delay the performance of cache or main memory read operations. Considering that memory reads are generally of higher priority than memory writes, due to the dependence of the program being executed upon the retrieval of program or data from memory, write buffer 27 provides significant performance improvement over conventional techniques.

2.3 Retiring of write buffer entries

Figure 10:
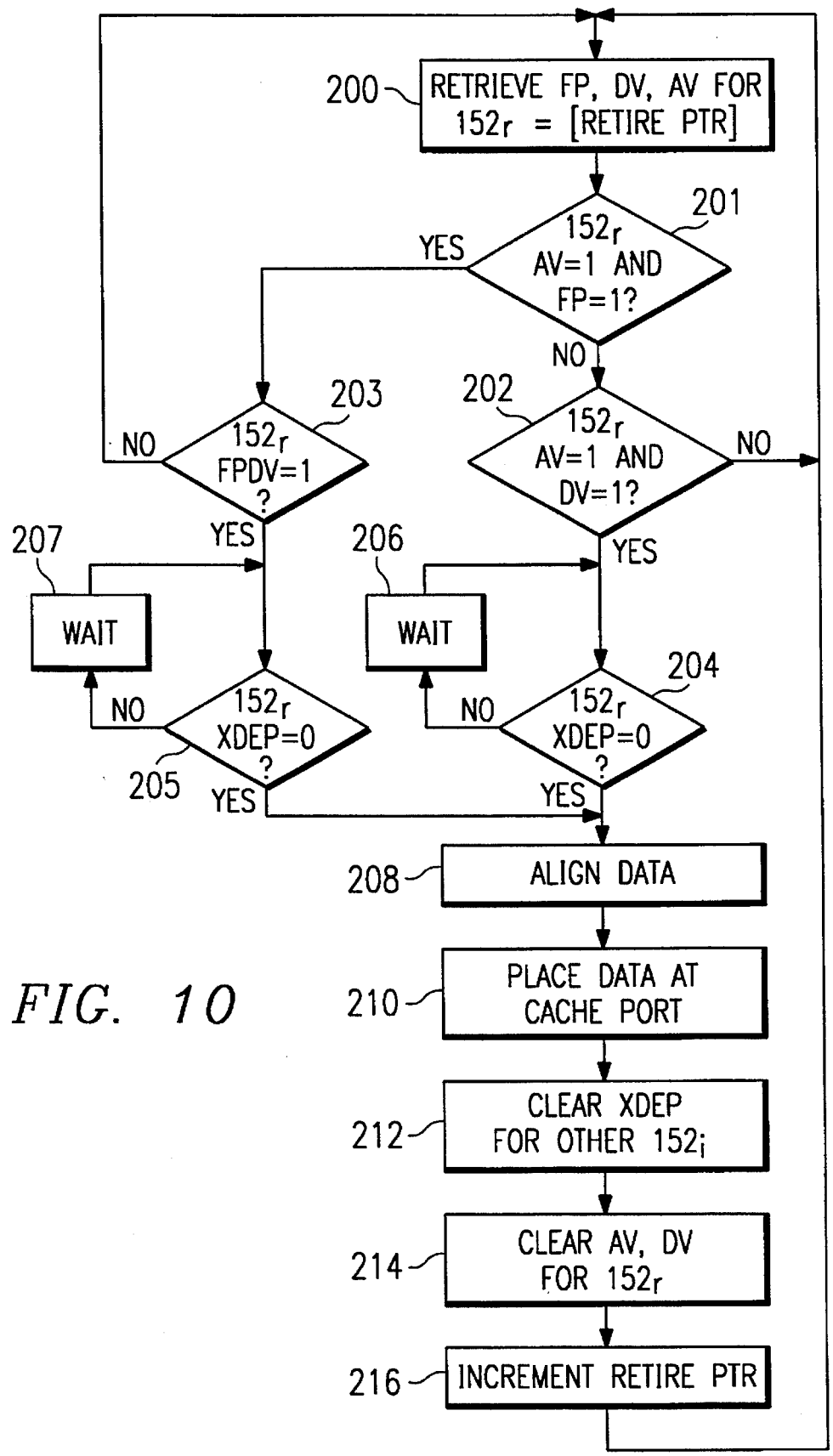
FIG. 10 is a flow chart illustrating the retiring of a write buffer entry according to the preferred embodiment of the invention.

Referring now to FIG. 10, the sequence by way of which write buffer entries 152 are retired under the control of cache control logic contained within or provided in conjunction with unified cache 70 will now be described in detail. Certain special or complex write operations will be described in specific detail hereinbelow. As such, the retiring sequence of FIG. 10 is a generalized sequence.

2.3.1 Retiring of integer write buffer data

As noted above, the retiring sequence of FIG. 10 is performed under the control of cache control logic contained within or in conjunction with unified cache 70, and is asynchronous relative to the operation of the X and Y pipelines. As noted above, it is important that write buffer entries 152 be retired in program order. Accordingly, write buffer 27 operates as a circular buffer with the sequence determined by retire pointers 158x, 158y for the two portions of write buffer 27. Retire pointers 158x, 158y maintain the program order of write buffer entries 152 in their corresponding sections 152x, 152y of write buffer 27, and cross-dependency control bits XDEP maintain order of entries 152 between sections 152x, 152y, as will be noted from the following description.

For ease of explanation, as in the case of the allocation sequence described hereinabove, the sequence of FIG. 10 will be described relative to one of the sections 152x, 152y of write buffer 27. The retiring sequence for the opposite section 152x, 152y of write buffer 27 will be identical.

The retiring sequence begins with process 200, in which floating point control bit FP, data valid control bit DV and address valid control bit AV are retrieved from write buffer entry $152_r$, which is the one of write buffer entries 152 that retire pointer 158 is indicating as the next entry 152 to be retired. In decision 201, floating point control bit FP and address valid control bit AV are tested to determine if write buffer entry $152_n$ is associated with floating point data latch 166 (and thus is buffering floating point results from the FPU). If both floating point control bit FP and address valid control bit AV are set, write buffer entry $152_n$ is associated with floating point data and the data will be retired according to the process described in section 2.3.2 hereinbelow.

If address valid control bit AV is set and floating point control bit FP is clear, write buffer entry $152_r$ is directed to integer data. Decision 202 is next performed, in which the cache control logic determines if address valid control bit AV and data valid control bit DV are both set. If not, (either of AV and DV being clear), entry $152_r$ is not ready to be retired, and control passes to process 200 for repetition of the retrieval and decision processes. If both are set, valid integer data is present in the data portion of write buffer entry $152_r$, and the entry may be retirable.

Decision 204 is then performed to determine if cross-dependency control bits XDEP are all clear for write buffer entry $152_r$. As described hereinabove, cross-dependency control bits XDEP are a snapshot of the address valid control bits AV for the write buffer entries 152 in the opposite section of write buffer 27 beginning at allocation of write buffer entry $152_r$, and updated upon the retirement of each write buffer entry 152. If all of the cross-dependency control bits XDEP are clear for write buffer entry 152r (and retire pointer 158 is pointing to it), write buffer entry 152r is next in program order to be retired, and control passes to process 208.

If cross-dependency control bits XDEP are not all clear, than additional write buffer entries 152 in the opposite section of write buffer 27 must be retired before entry $152_y$ may be retired, so that program order may be maintained. Wait state 206 is effected, followed by repetition of decision 204, until the write buffer entries 152 in the opposite section that were allocated prior to the allocation of write buffer entry $152_r$ are retired first.

As will be described in detail hereinbelow, microprocessor 10 may include provisions for performing non-cacheable reads from main memory 86, which must be performed in program order. The presence of a previously allocated non-cacheable read is indicated for each write entry by non-cacheable read allocation control bit NCRA being set; upon execution of the non-cacheable read, control bit NCRA is cleared for all write buffer entries 152. If this feature is implemented, decision 204 will also test the state of non-cacheable read allocation control bit NCRA, and prevent the retiring of write buffer entry $152_r$ until such time as both all cross-dependency control bits XDEP and also non-cacheable read allocation control bit NCRA are clear.

Process 208 is then performed, in which the data section of write buffer entry $152_r$ is aligned with the appropriate bit or byte position for presentation to cache port 160 or to the memory bus. This alignment is necessary considering that the physical memory address corresponds to specific byte locations, but the data is presented in up to sixty-four bit words (eight bytes). As such, alignment of data with the proper bit positions is important to ensure proper memory write operations. In addition, special alignment operations such as required for gathered writes and for misaligned writes are accomplished in process 208. Details of these alignment features and sequences are described hereinbelow.

Process 210 then forwards the data portion of write buffer entry $152_r$ to cache port 160, whether directly or via the special write circuitry shown in FIG. 4. Once this occurs, the one of cross-dependency control bits XDEP corresponding to write buffer entry $152_r$ is cleared in each write buffer entry $152_i$ in the opposite section of write buffer 27 (in process 212). This allows the next write buffer entry 152 in sequence (i.e., the write buffer entry $152_i$ pointed to by the opposite retire pointer 158) to be retired in the next operation. Process 214 clears address valid control bit AV and data valid control bit DV for the write buffer entry $152_r$ currently being retired. Process 216 then increments retire pointer 158 for its section to enable the retirement of the next write buffer entry 152 in sequence, and allow re-allocation of write buffer entry $152_r$. Control of the retiring sequence then passes back to process 200 for retrieval of the appropriate control bits.

As noted above, while a single cache port 160 is schematically illustrated in FIG. 4 and discussed relative to process 210 hereinabove, cache port 160 serves as a dual cache port and write buffer 27 in microprocessor 10 of FIG. 1a is also in communication directly with data bus DATA. Accordingly, in this case, the cache control logic will select the appropriate port to which write buffer 27 presents data from entry $152_r$ in process 210.

Furthermore, the provision of dual cache port 160 allows for additional streamlining in the case where two sections of write buffer 27 are provided, as shown in FIG. 4, as data may be presented from two write buffer entries 152 (one in each of the X and Y sections 152x, 152y of write buffer 27) simultaneously via the dual cache port 160. If such simultaneous presentation of data is provided, the cross-dependency decision 204 must allow for one of the write buffer entries 152 to have a single set cross-dependency control bit XDEP, so long as the simultaneously presented write buffer entry 152 corresponds to the set XDEP bit. The retiring process may thus double its output rate by utilizing the two sections 152x, 152y of write buffer 27.

2.3.2 Retire of floating point write buffer data

If decision 201 determines that both address valid control bit AV and floating point control bit FP are set, write buffer entry $152_r$ to which retire pointer 158 points is associated with floating point results from the FPU. According to this embodiment of the invention, data valid control bit DV for entry $152_r$ will also be set despite the absence of valid integer data therein, for purposes of exception handling as will be described hereinbelow.

Decision 203 is then performed, by way of which the cache control logic interrogates floating point data valid control bit FPDV of floating point data latch 166 to see if the FPU has written data thereto, in which case control bit FPDV will be set. Floating point data valid control bit FPDV is analogous to data valid control bit DV of write buffer entries 152, as it indicates when set that the FPU has written valid data thereto. Conversely, if control bit FPDV is clear, the FPU has not yet written data to floating point data latch 166, in which case decision 204 will return control to process 200 in the retire sequence of FIG. 10.

If floating point data valid control bit FPDV is set, decision 205 is then performed by way of which cross-dependency control bits XDEP of write buffer entry $152_r$ are interrogated to see if all bits XDEP are cleared. If not, additional write buffer entries 152 that were allocated in program order prior to entry $152_r$, and that reside in the opposite section of write buffer 27 from entry $152_r$, must be retired prior to entry $152_r$ being retired. Wait state 207 is then executed, and decision 205 is repeated. Upon all cross-dependency control bits XDEP of entry $152_r$ becoming clear, decision 205 passes control to process 208, for alignment and presentation of the contents of floating point data latch 166 to cache port 160. As noted above, if simultaneous presentation of two write buffer entries 152 are allowed via dual cache port 160, one of the entries 152 may have a single set XDEP bit so long as it corresponds to the simultaneously presented entry of the pair.

Cross-dependency control bits XDEP in opposite section entries 152 are then cleared (process 212), address valid control bit AV and floating point data valid control bit FPDV are cleared (process 214), and retire pointer 158 is incremented (process 216), as in the case of integer data described hereinabove.

2.4 Ordering of non-cacheable reads

The cross-dependency scheme used in the allocation of write buffer entries 152 described hereinabove may also be used for other functions in microprocessor 10. Similarly as for non-cacheable writes described hereinbelow, microprocessor 10 may have instructions in its program sequence that require non-cacheable reads from memory. By way of definition, a noncacheable read is a read from main memory 86 that cannot by definition be from cache 70; the non-cacheable read may, for purposes of this description, be considered as a single entry read buffer that serves as a holding latch for requesting a read access to main memory 86. In order to ensure proper pipeline operation, non-cacheable reads must be executed in program order. Accordingly, especially in the case of superpipelined superscalar architecture microprocessor 10 described herein, a method for maintaining the program order of non-cacheable reads is necessary.

Figure 17:
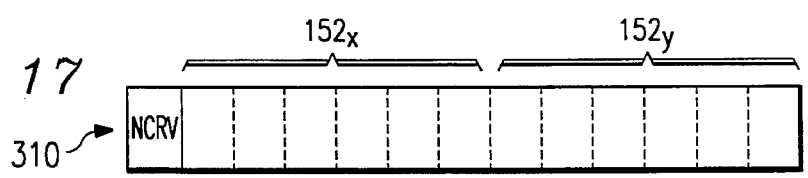
FIG. 17 is a representation of a non-cacheable read cross-dependency field as used in the microprocessor of FIG. 1a according to the preferred embodiment of the invention.

Referring now to FIG. 17, non-cacheable read cross-dependency field 310 according to the preferred embodiment of the invention is illustrated. Non-cacheable read cross-dependency field 310 is preferably maintained in cache control logic of unified cache 70, and includes allocated control bit NCRV which indicates, when set, that a non-cacheable read has been allocated. Similarly as cross-dependency control bits XDEP described hereinabove, and as described above, non-cacheable read allocation control bit NCRA in each write buffer entry 152 is set, at the time of its allocation, if allocated control bit NCRV is set, indicating that a non-cacheable read is previously allocated. Control bit NCRA is tested during the retiring of each write entry 152 to ensure proper ordering of requests to main memory 86.

In addition, non-cacheable read cross-dependency field 310 contains one bit position mapped to each of the address valid control bits AV of each write buffer entry 152, to indicate which of write buffer entries 152 are previously allocated at the time of allocation of the non-cacheable read, and to indicate the retirement of these previously allocated write buffer entries 152. Non-cacheable read cross-dependency field 310 operates in the same manner as cross-dependency control bits XDEP, with bits set only upon allocation of the non-cacheable read, and cleared upon retirement of each write buffer entry.

Figure 18A:
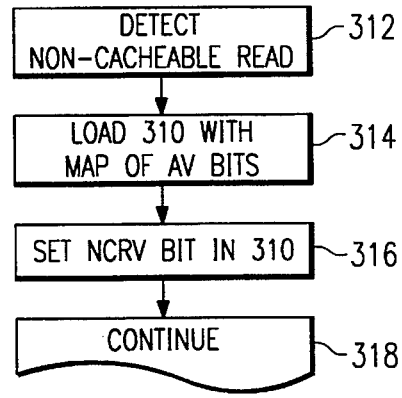
FIGS. 18a and 18b are flow charts illustrating the allocation and retiring sequences, respectively, of a noncacheable read operation according to the preferred embodiment of the invention.
Figure 18B:
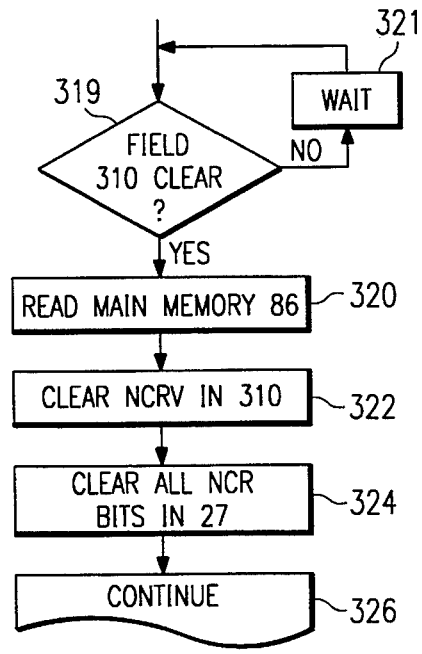

Referring now to FIGS. 18a and 18b, the processes of allocating and retiring a non-cacheable read operation according to the preferred embodiment of the invention will now be described in detail. In FIG. 18a, the allocation of non-cacheable read is illustrated by process 312 first determining that an instruction includes a non-cacheable read. Process 314 is then performed by way of which a snapshot of the address valid control bits AV are loaded into non-cacheable read cross-dependency field 310. Process 316 is then performed, in which allocated control bit NCRV in non-cacheable read cross-dependency field 310 is set, indicating to later-allocated write buffer entries 152 that a non-cacheable read operation has already been allocated. Address calculation stage AC2 then continues (process 318).

FIG. 18b illustrates the performing of the non-cacheable read, under the control of the control logic of unified cache 70. Decision 319 determines if non-cacheable read cross-dependency field 310 is fully clear. If any bit in non-cacheable read cross-dependency field 310 is set, one or more of the write buffer entries 152 allocated previously to the non-cacheable read has not yet been retired; wait state 321 is then entered and decision 319 repeated until all previously allocated write buffer entries have been retired.

Upon non-cacheable read cross-dependency field 310 being fully clear, the non-cacheable read is next in program order to be performed. Process 320 is then executed to effect the read from main memory 86 in the conventional manner. Upon completion of the read, allocated control bit NCRV in non-cacheable read cross-dependency field 310 is cleared in process 322, so that subsequent allocations of write buffer entries 152 will not have their non-cacheable read allocated control bits NCRA set. Process 324 then clears the non-cacheable read allocated control bits NCRA in each of write buffer entries 152, indicating the completion of the non-cacheable read and allowing retiring of subsequent write buffer entries 152 in program order.

Considering that non-cacheable read allocated control bits NCRA in write buffer entries 152, taken as a set, correspond to non-cacheable read cross-dependency field 310, it is contemplated that the use of a single set of these indicators can suffice to control the program order execution of the non-cacheable read. For example, if only non-cacheable read cross-dependency field 310 is used, allocation and retiring of write buffer entries 152 would be controlled by testing field 310 to determine if a non-cacheable read has been allocated, and by testing the corresponding bit position in field 310 to determine if the particular write buffer entry 152 was allocated prior to or after the non-cacheable read.

Therefore, according to this preferred embodiment of the invention, non-cacheable read operations can be controlled to be performed in program order relative to the retiring of write buffer entries 152.

3. Read-after-write hazard detection and write buffer operation

As discussed above, certain hazards are inherent in pipelined architecture microprocessors, and particularly in superpipelined superscalar microprocessors such as microprocessor 10. An important category of such hazards are data dependencies, which may occur if multiple operations to the same register or memory location are present in the pipeline at a given time.

A first type of data dependency is the read-after-write (RAW) data dependency, in which a write and a read to the same memory location are present in the pipeline, with the read operation being a newer instruction than the write. In such a case, the programmer has assumed that the write will be completed before the read is executed. Due to pipeline operation, however, the memory access for the read operation may be performed prior to the execution of the write, particularly if the read operation is implicit in another instruction such as an add or multiply. In this event, the read will return incorrect data to the core, since the write to the memory location has not yet been performed. This hazard is even more likely to occur in a superscalar superpipelined architecture of microprocessor 10, and still more likely if instructions can be executed out of program order, as described above.

Figure 11:
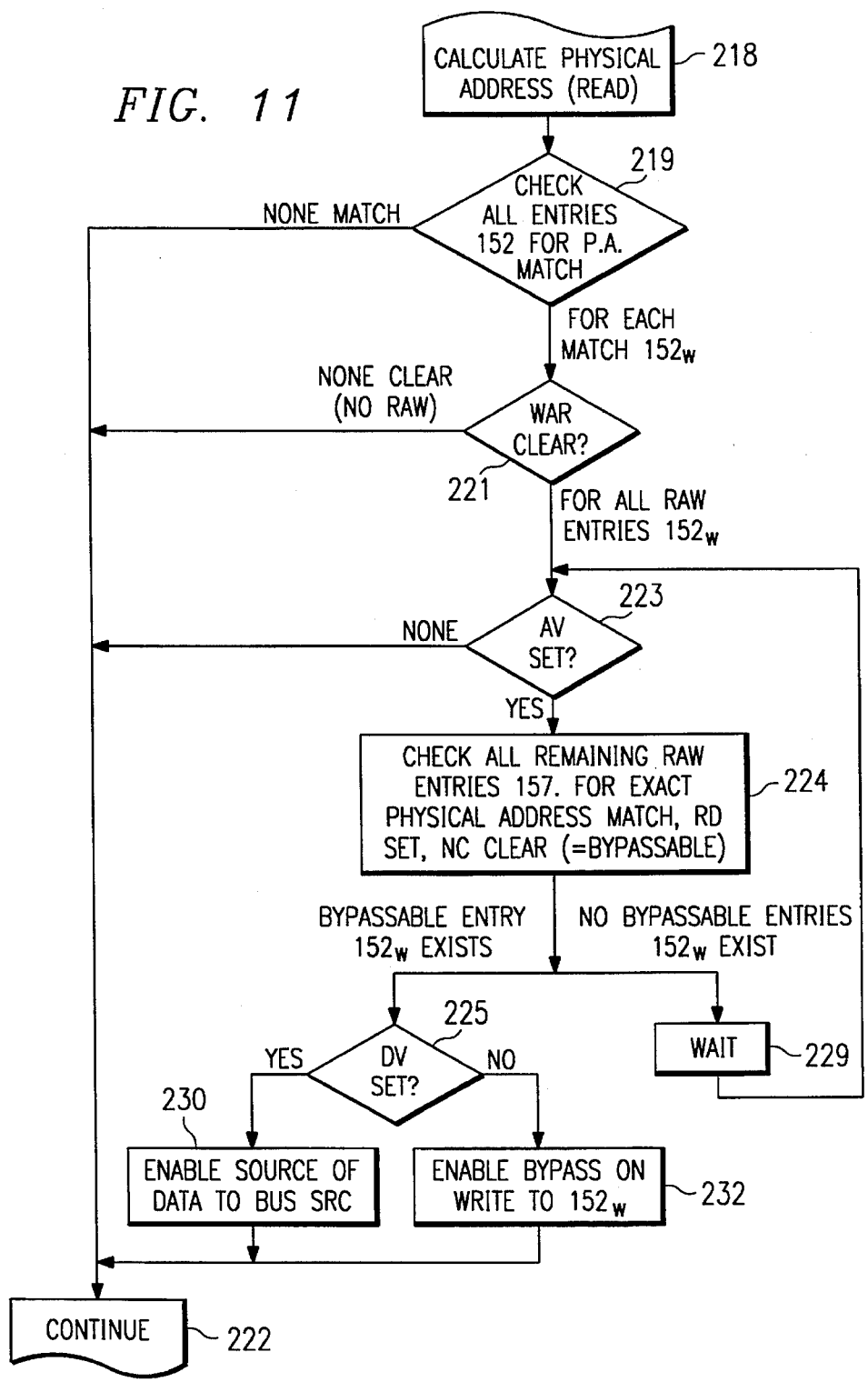
FIG. 11 is a flow chart illustrating a method for detecting and handling dependency hazards according to the preferred embodiment of the invention.

Referring to FIG. 11, the sequence of detecting and handling RAW hazards in microprocessor 10 according to the preferred embodiment of the invention will now be described in detail. In this example, RAW hazard detection occurs as a result of physical address calculation process 218 performed in the second address calculation stage AC2 of the X and Y pipelines for each read instruction. In decision 219, write buffer control logic 150 compares the read physical address calculated in process 218 against each of the physical address values in all write buffer entries 152, regardless of pipeline association. This comparison not only compares the physical address of the read access to those of the previously allocated addresses, but also considers the span of the operations, in the manner described hereinabove relative to process 178 in FIGS. 6 and 7. This comparison is also performed relative to the instruction currently in the second address calculation stage of the opposite X or Y pipeline. If there is no overlap of the read operation with any of the writes that are either previously allocated, or simultaneously allocated but earlier in program order, no RAW hazard can exist for that particular read operation, and execution continues in process 222. If decision 219 determines that there is a match between the physical address calculated for the read operation and the physical address for one or more write buffer entries $152_w$ that is allocated for an older instruction and has its address valid control bit AV set or that is allocated for a simultaneously allocated write for an older instruction, a RAW hazard may exist and the hazard handling sequence illustrated in FIG. 11 continues.

As noted above, one of the control bits for each write buffer entry 152 is write-after-read control bit WAR. This control bit indicates that the write operation for which a write buffer entry 152 is allocated is a write-after-read, in that it is a write operation that is to occur after an older (in program order) read instruction that is in the second address calculation stage AC2 of the opposite pipeline at the time of allocation. Control bit WAR is set in the allocation sequence (process 182 of FIG. 6) if this is the case. This prevents lockup of microprocessor 10 if the newer write operation executes prior to the older read operation, as the older read operation would, upon execution, consider itself a read-after-write operation that would wait until the write is cleared; since the write operation is newer than the read and will wait for the read to clear, though, neither the read nor the write would ever be performed. Through use of control bit WAR, microprocessor 10 can determine if an apparent RAW hazard is in fact a WAR condition, in which case the write can be processed.

Accordingly, referring back to FIG. 11, decision 221 determines if control bit WAR is set for each write buffer entry $152_w$ having a matching physical address with that of the read, as determined in decision 219. For each entry $152_w$ in which the WAR bit is set, no RAW conflict exists; accordingly, if none of the matching entries $152_w$ have a clear WAR bit, execution of the read continues in process 222. However, for each matching write buffer entry $152_w$ in which write control bit WAR is not set, a RAW hazard does exist and the hazard handling sequence of FIG. 11 will be performed for that entry $152_w$. Of course, other appropriate conditions may also be checked in decision 221, such as the clear status of the write buffer no-op control bit WBNOP, and the status of other control bits and functions as may be implemented in the particular realization of the present invention.

Decision 223 is next performed in which the address valid control bit AV is tested for each RAW entry $152_w$. Decision 223 is primarily performed to determine if those RAW entries $152_w$ causing wait states for the read operation (described below) have been retired. If no remaining RAW entries $152_w$ have their address valid control bits AV set, the RAW hazard has been cleared and the read operation can continue (process 222).

For each of the remaining matching RAW entries $152_w$, process 224 is next performed to determine if the entry is bypassable, or if the write causing the hazard must be completed prior to continuing the read operation. According to the preferred embodiment of the invention, techniques are available by way of which unified cache 70 and, in some cases write buffer 27, need not be written with the data from the write prior to sourcing of the data to the read operation in core 20.

Such bypassing is not available for all writes, however. In this example, the results of non-cacheable writes (indicated by non-cacheable control bit NC being set in entry 152) must be sourced from main memory 86. Secondly, as discussed hereinabove, a special case of RAW hazard is a read after multiple writes to the same physical location. As shown in FIG. 6, process 178 of the allocation sequence sets readable control bit RD of a write buffer entry 152 and clears readable control bit RD of all previously allocated write buffer entries to the same physical address. Conversely, those write buffer entries 152 that are not readable (i.e., their readable control bit RD is clear) cannot be used to source data to core 20, as their data would be in error. Thirdly, data cannot be sourced from a write operation if the subsequent read encompasses bytes not written in the write operation, as an access to cache 70 or main memory 86 would still be required to complete the read.

In the RAW handling sequence of FIG. 11, process 224 is performed on each matching write buffer entry $152_w$ to determine if the readable control bit RD for entry $152_w$ is set (indicating that entry 152, is the last entry 152 allocated to the physical address of the read), to determine if the non-cacheable write control bit NC is clear (indicating that the write is not non-cacheable), and also to determine if the physical address of the read is an "exact" match to that of the write to write buffer entry $152_w$, in that the bytes to be read are a subset of the bytes to be written to memory. An entry $152_w$ for which all three conditions are met are said to be "bypassable" and control passes to decision 225 described below. If no bypassable entry $152_w$ exists, as one or more of the above conditions (non-cacheable, non-readable, or non-exact physical address) are not met, wait state 229 is effected and control passes back to decision 223; this condition will remain until all non-bypassable entries $152_w$ are retired as indicated by their address valid control bits AV being clear, after which the read operation may continue (process 222).

In this embodiment of the invention, the method of bypassing applicable to each bypassable entry $152_w$ is determined in decision 225, in which data valid control bit DV is tested to determine if write buffer entry $152_w$ is pending (i.e., contains valid data) but not yet retired. For each bypassable entry $152_w$ that is pending, process 230 is performed by write buffer control logic 150 to enable the sourcing of the contents of the data portion of write buffer entry $152_w$ directly to core 20 without first having been written to memory. Referring to FIG. 4, process 230 is effected by write buffer control logic 150 enabling write buffer entry $152_w$, at the time of the read operation, to place its data on its source bus SRC (i.e., the one of buses SRCx, SRCy for the section of write buffer 27 containing entry $152_w$) and by controlling the appropriate multiplexer 154 to apply source bus SRC to the one of the X or Y pipelines of core 20 that is requesting the data. In this case, therefore, the detection of a RAW hazard is handled by sourcing data from write buffer 27 to core 20, speeding up the time of execution of the read operation.

For those bypassable write buffer entries $152_w$ that are not yet pending, however, as indicated by decision 225 finding that data valid control bit DV is not set, valid data is not present in entry $152_w$, and cannot be sourced to core 20 therefrom. Process 232 is performed for these entries $152_w$ so that, at the time that the write by core 20 to write buffer entry $152_w$ occurs, the valid data on writeback bus WB_x or WB_y (also present on the corresponding bypass bus BP_x, BP_y and applied to the appropriate one of multiplexers 154x, 154y) will be applied to the requesting X or Y pipeline in core 20. In this way, the RAW hazard is handled by bypassing write buffer 27 with the valid data, further speeding the execution of the read operation, as the storing and retrieval of valid data from cache 70, main memory 86, or even the write buffer entry $152_w$ are not required prior to sourcing of the data to core 20.

4. Speculative execution and exception handling 4.1 Speculative execution

As noted above, superpipelined superscalar microprocessor 10 according to the preferred embodiment of the invention is capable of executing instructions in a speculative manner. The speculation arises from the execution of one or more instructions after a conditional branch or jump statement, prior to determining the state of the condition upon which the jump or branch is based. Without speculative execution, the microprocessor would have to wait for the execution of the instruction that determines the state of the condition, prior to execution of any subsequent instructions, resulting in a pipeline "stall" condition. In speculative execution, microprocessor 10 speculates to the state of the condition, and executes instructions based on this speculation. The effect of pipeline stalls is reduced significantly, depending upon the number of speculative executions undertaken and the rate at which the speculation is accurate.

Figure 12A:
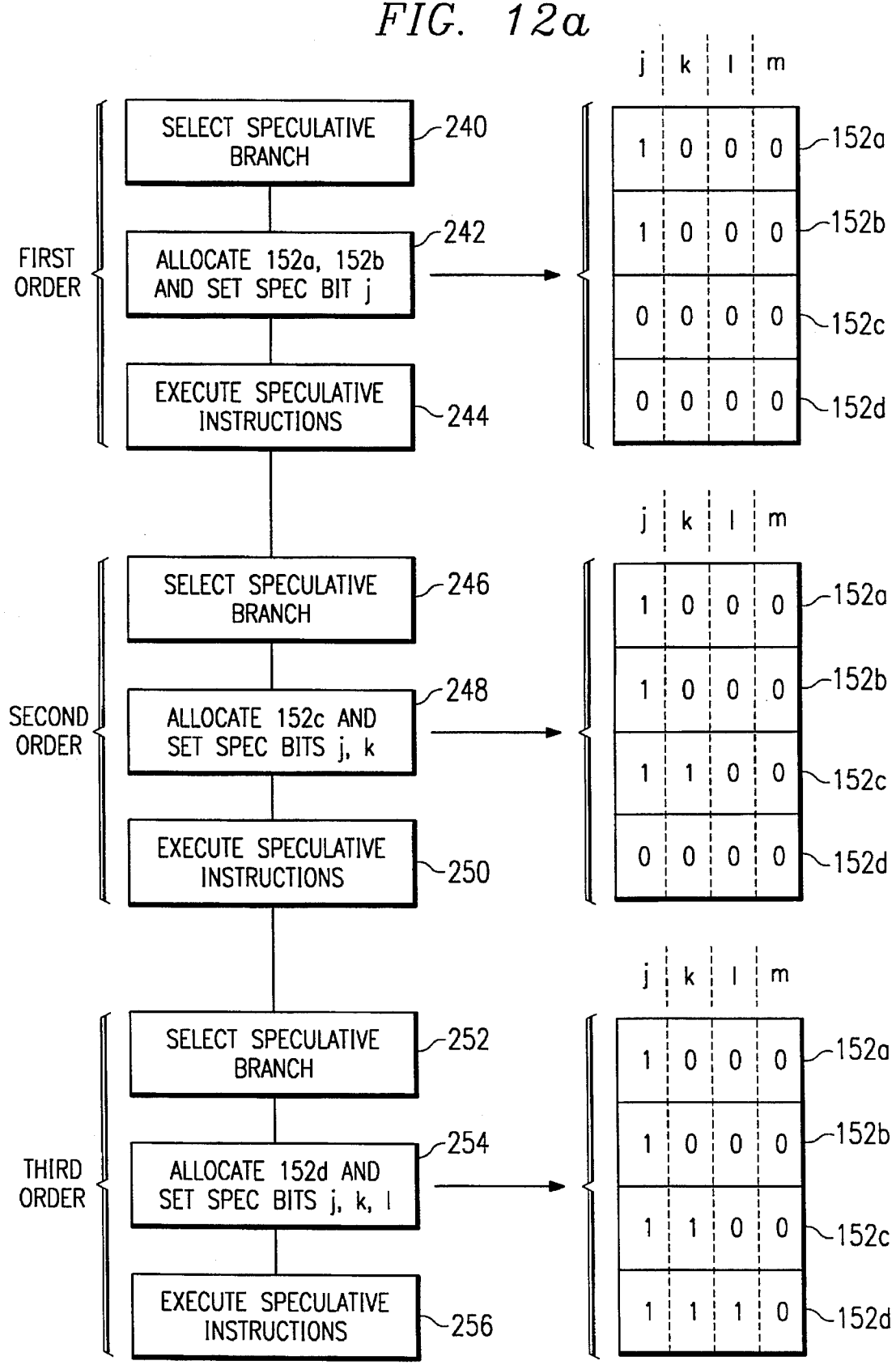
FIGS. 12a and 12b are flow charts illustrating a method for processing speculative execution and speculation faults according to the preferred embodiment of the invention.
Figure 12B:
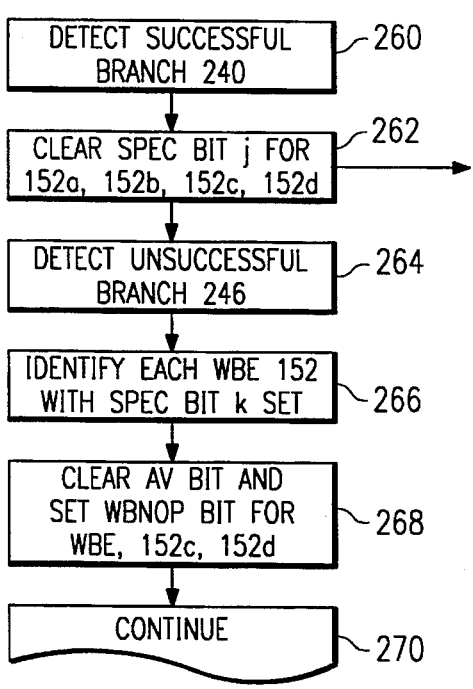

Microprocessor 10 according to this embodiment of the invention includes circuitry for rapidly clearing the effect of unsuccessful speculation, particularly in ensuring that the results of speculative writes are not retired to memory and in removing the speculatively written data from write buffer 27. Referring now to FIGS. 12a and 12b, a method for executing speculative writes and handling unsuccessful speculation will now be described in detail. The flow diagrams of FIGS. 12a and 12b illustrate this method by way of example, rather than in a generalized manner; it is contemplated that one of ordinary skill in the art having reference to the following description of this example will be able to readily implement the method of FIGS. 12a and 12b in a microprocessor realization.

The exemplary sequence of FIG. 12a begins with process 240, in which core 20 selects a series of instructions to be performed in a speculative manner, in that the series of instructions correspond to one result of a conditional branch where the condition is not yet known. The determination of which of the conditional branches (i.e., whether or not to take the conditional branch or jump) to select may be made according to conventional predictive branching schemes. In process 242, allocation of two write buffer entries 152a, 152b (the speculative branch including two write operations to memory, in this example) is performed in the second address calculation stage AC2 of the pipeline, as described hereinabove. However, because the write operations to write buffer entries 152a, 152b is speculative, at least one of the speculation control bits SPEC is set during the allocation of process 242, depending upon the order of speculation of the write.

In this embodiment of the invention, four orders of speculative execution are permitted. The order, or degree, of speculation is indicated for each write buffer entry 152 by the four j, k, l, m speculation control bits (SPEC bits), with each bit position corresponding to whether the write buffer entry 152 is a speculative write for one of the selected conditional branches. FIG. 12a illustrates the condition of four write buffer entries 152a, 152b, 152c, 152d after the allocation of process 242. As shown in FIG. 12a, write buffer entries 152a, 152b allocated in process 242 have their j SPEC bit set. Because the allocation of process 242 is for first order speculation (i.e., it is the first speculation made in this example), only the single j SPEC control bit is set for entries 152a, 152b. Write buffer entries 152c, 152d are not yet allocated, and as such their speculation control bits are clear.

After the allocation of process 242, initiation of the execution of the speculative instructions in the selected conditional branch begins in process 244. The execution of these instructions will, if completed, effect the writes to allocated write buffer entries 152a, 152b, such that their data valid control bits DV become set. Because the execution of these writes is speculative, however, the retire sequence described relative to FIG. 10 should also include (where speculative execution is incorporated) a gating decision preventing the retiring of a write buffer entry 152 unless its speculation control bits SPEC are all clear. This prevents the results of speculative execution from reaching memory, where it is more difficult and time-consuming, if possible at all, to recover in the event that the speculative prediction was incorrect (i.e., the other branch from that selected in process 240 should have been taken).

In the example of FIG. 12a, second order speculation also occurs, such that one of the instructions in the branch selected in process 240 included another conditional branch or jump, for which predictive branch selection is again performed in process 246 to keep the pipeline from stalling. Second order speculation means that in order for the execution of the instructions for the branch selected in process 246 to be successful, not only must the selection in process 246 be correct but the selection in process 240 must also be correct. While process 246 is shown in FIG. 12a as occurring after the execution of the instructions in process 244, due to the superpipelined architecture of microprocessor 10 described hereinabove, the predictive branching of process 246 will often occur prior to completion of the execution initiated in process 244. Following selection of the branch in process 246, write buffer entry 152c is allocated in process 248 (again during the second address calculation pipeline stage). In this allocation of process 246, since any write to write buffer entry 152c is of second order speculation, both the j and k SPEC control bits are set. The state of speculation control bits SPEC for write buffer entries 152a, 152b, 152c, 152d after process 246 is shown in FIG. 12a. Execution of the speculative instructions in the branch selected in process 246 is then initiated in process 250.

In the example of FIG. 12a, third order speculation is also undertaken, meaning that the sequence of instructions in the branch selected in process 246 also includes another conditional branch or jump. Process 252 selects one of the branches according to predictive branch selection; however, in order for this third order selection to be successful, all three of the selections of processes 240, 246 and 252 must be successful. Again, as before, process 252 may make the selection of the branch prior to completion of the execution of the instructions in process 250, considering the superpipelined architecture of microprocessor 10. In this example, write buffer entry 152d is allocated in process 254, with the three j, k and l SPEC bits set in write buffer entry 152d. The state of the speculation control bits SPEC for write buffer entries 152a through 152d after process 254 is illustrated in process 254. Process 256 then executes the instructions of the branch selected in process 252, including a write operation to write buffer entry 152d.

Referring now to FIG. 12b, an example of the handling of both successful and unsuccessful speculative execution by write buffer 27 will now be described. As in the example of FIG. 12a, the sequence of FIG. 12b is by way of example only rather than for the general case, but it is contemplated that one of ordinary skill in the art will be able to readily realize the method in a microprocessor architecture.

In process 260, core 20 detects that the first selection of process 240 was successful, such that the condition necessary to cause the branch (or non-branch) to the instructions executed in process 244 was satisfied in a prior instruction. Accordingly, the contents of the data portions of write buffer entries 152a, 152b allocated in process 242 and written in process 244 may be retired to memoreX, as their contents are accurate results of the program being executed. In process 262, therefore, the j SPEC bits of all speculative write buffer entries 152a, 152b, 152c, 152d are cleared; the state of speculation control bits SPEC for write buffer entries 152a through 152d after process 262 is illustrated in FIG. 12b. Since write buffer entries 152a, 152b now have all of their speculation control bits SPEC clear (and since its data valid control bit DV was previously set), write buffer entries 152a, 152b may be retired to unified cache 70 or main memory 86, as the case may be.

In the example of FIG. 12b, the second branch selection (made in process 246) is detected to be unsuccessful, as the condition necessary for the instructions executed in process 248 was not satisfied by the prior instruction. Furthermore, since the selection of the branch made in process 252 also depended upon the successful selection of process 246, the condition necessary for the instructions to be executed in process 256 also will not be satisfied. To the extent that the writes to write buffer entries 152c, 152d have not yet been performed, these writes will never be performed, because of the unsuccessful predictive selection noted above; to the extent that these writes occurred (i.e., write buffer entries 152c, 152d are pending), the data should not be written to memory as it is in error. Accordingly, write buffer entries 152c, 152d must be cleared for additional use, without retiring of their contents.

The sequence of FIG. 12b handles the unsuccessful speculative execution beginning with process 266, in which those write buffer entries 152 having their k SPEC bit set are identified by write buffer control logic 150. In this example, these identified write buffer entries 152 are entries 152c (second order speculation) and 152d (third order speculation). In process 268, write buffer control logic 150 clears the address valid control bits AV for each of entries 152b, 152c, such that entries 152c, 152d may be reallocated and will not be retired (see the retire sequence of FIG. 10, in which the AV bit must be set for retiring to take place).

As described hereinabove, retire pointers 158x, 158y point to the ones of write buffer entries 152 next to be retired. According to the preferred embodiment of the invention, write buffer no-op control bits WBNOP are set for write buffer entries 152c, 152d, such that when the associated retire pointer 158 points to entries 152c, 152d, these entries will be skipped (as though they were never allocated). This allows for retire pointers 158 to "catch up" to allocation pointers 156 if their section of write buffer 27 is empty. Repeated checking of the address valid control bits AV in the retire process can then safely stop, once the empty condition has been met.

Execution of the proper conditional branch can resume in process 270 shown in FIG. 12b.

4.2 Exception handling

In addition to speculative execution, pipeline stalls and bubbles may occur in the event that execution of an instruction returns an error condition, commonly referred to as an exception. An example of an exception is where core 20 detects a divide-by-zero condition. When such an exception is detected in the execution stage of the pipeline, the instructions still in the pipeline must be cleared in order for the exception condition to be properly handled in the conventional manner. Specifically relative to write buffer 27, those write buffer entries 152 which were allocated after the instruction resulting in an exception must be flushed. Since the writes to these entries 152 will never occur (and data valid control bit DV would never be set) because of the removal of the write instructions from the pipeline, entries 152 would never retire from write buffer 27 if not otherwise flushed; microprocessor 10 would then hang indefinitely, waiting for data that would never arrive.

Figure 13:
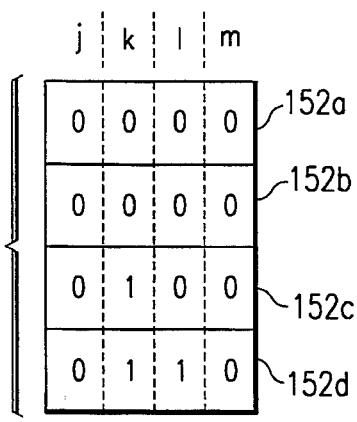
FIG. 13 is a flow chart illustrating a method for handling exceptions according to the preferred embodiment of the invention.
Figure 13:
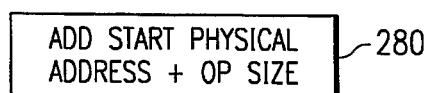
Figure 13:
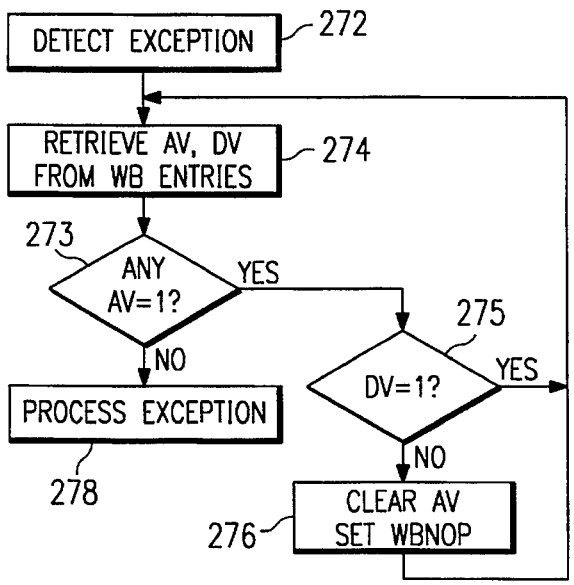

Referring now to FIG. 13, an example of a sequence for handling exceptions relative to write buffer 27 will now be described in detail. In process 272, core 20 detects an exception condition. Process 274 is then performed by write buffer control logic 150, in which the address valid control bit AV and data valid control bit DV are retrieved from each write buffer entry 152 in write buffer 27. Decision 273 then determines if any of the address valid control bits AV are set in write buffer 27. For each write buffer 152 that has its address valid control bit AV set, decision 275 tests its data valid control bit DV to determine if it is set. If not (meaning that the write to that entry 152 had not yet occurred at the time of the exception), address valid control bit AV is cleared and write buffer no-op bit WBNOP is set for that entry 152. As described hereinabove, write buffer no-op bit WBNOP indicates that retire pointers 158 can skip this entry 152, such that the empty condition where allocation pointers 156x, 156y equal their respective retire pointers 158x, 158y can be achieved. Control is then returned to process 274 as will be described hereinbelow.

For those pending write buffer entries having both their address valid control bits AV and data valid control bits DV set (as determined by decisions 273, 275), data was written by core 20 prior to the exception condition. As such, data written to these locations is valid, and can be written to memory in the normal asynchronous retiring sequence as described hereinabove relative to FIG. 10. However, prior to the processing of the exception by microprocessor 10, all entries of write buffer 27 must be retired and available for allocation (i.e., write buffer 27 must be empty). Control of the sequence thus returns to process 274, where the address valid control bits AV and data valid control bits DV are again retrieved and interrogated, until such time as the address valid control bits AV for all write buffer entries 152 are clear. Both allocation pointers 156x, 156y will point to the same entry 152 as their respective retire pointers 158x, 158y when all address valid control bits AV are clear, considering the effect of the write buffer no-op bits WBNOP. Once this empty condition is achieved, process 278 can be initiated in which the exception condition is processed in the usual manner.

5. Special write cycles from the write buffer

As noted above relative to FIG. 10, the retiring process may include special write operations from write buffer 27 to cache port 160 or directly to data bus DATA. According to the preferred embodiment of the invention, these special write cycles can include the handling of misaligned writes, and also write gathering. Sequences for handling these special write cycles according to the preferred embodiment of the invention will now be described in detail.

5.1 Misaligned writes

As noted above, physical memory addresses presented within microprocessor 10 correspond to byte addresses in memory, while data bus DATA is capable of communicating sixty-four bits in parallel (primarily from data input/output in bus interface unit BIU to unified cache 70 in this embodiment of the invention). Because the physical address in microprocessors of X86 compatibility type is not a modulo of the operand size, a significant fraction of memory writes may overlap eight-byte boundaries; these writes are referred to as "misaligned" writes. Write buffer 27 in microprocessor 10 according to the preferred embodiment of the invention accounts for such misaligned writes by indicating that a write buffer entry 152 is misaligned at the time of allocation, allocating a second write buffer entry 152 which presents the second portion of the write, and by initiating a special routine in the retiring process to account for the misaligned write. These sequences will now be described in detail relative to FIGS. 14 and 15.

Figure 14:
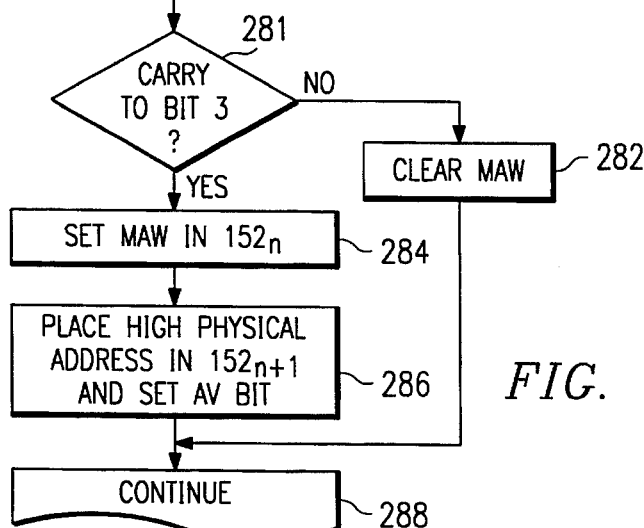
FIG. 14 is a flow chart illustrating a method for allocating write buffer locations for misaligned write operations, according to the preferred embodiment of the invention.

FIG. 14 is a flow diagram of a portion of process 182 of the allocation sequence of FIG. 6, for detecting misaligned writes and indicating the same for the write buffer entry 152 being allocated. In process 280 of FIG. 14, write buffer control logic 150 adds the physical address (lowest byte address) of the write operation to write buffer entry $152_n$ being allocated with the size (in bytes) of the write operation. Information regarding the size of the write operation is contained within the instruction, as is typical for X86 type microprocessor instructions. In decision 281, write buffer control logic determines if the addition of process 280 caused a carry into bit 3, indicating that the eight-byte boundary will be crossed by the write operation to the write buffer entry $152_n$ being allocated. If decision 281 determines that no carry occurred, then the write to entry $152_n$ will not be misaligned; process 282 is then performed in which misaligned write control bit MAW is cleared in entry 152., and the allocation sequence continues (process 288).

If a carry occurred, however, the write to entry $152_n$ will cross the eight-byte boundary, in which case process 284 is performed to set misaligned write control bit MAW in entry $152_n$. The next write buffer entry $152_{n+1}$ to be allocated is then allocated for purposes of the misaligned write, in process 286, by loading the address portion of entry $152_{n+1}$ with the physical start address for the write to the next eight-byte group (i.e., the eight-byte address after the detected carry in process 281), and setting the address valid control bit AV for entry $152_{n+1}$. A new physical address calculation (pipeline stage AC2) is required in process 286, considering that the high physical address may reside on a different physical page. The data portion of entry $152_{n+1}$ will remain empty, however, as entry $152_{n+1}$ will merely be used in the retiring process to effect the second operand write to memory. The remainder of the allocation process then continues (process 288).

Regardless of whether the write buffer entry $152_n$ is a misaligned write, issuing of data to entry $152_n$ occurs in the manner described hereinabove relative to FIG. 9. No special loading of the data portion of write buffer entry $152_n$ is effected according to this embodiment of the invention; in the case of a misaligned write, however, no issuing of data to entry $152_{n+1}$ will occur.

Figure 15:
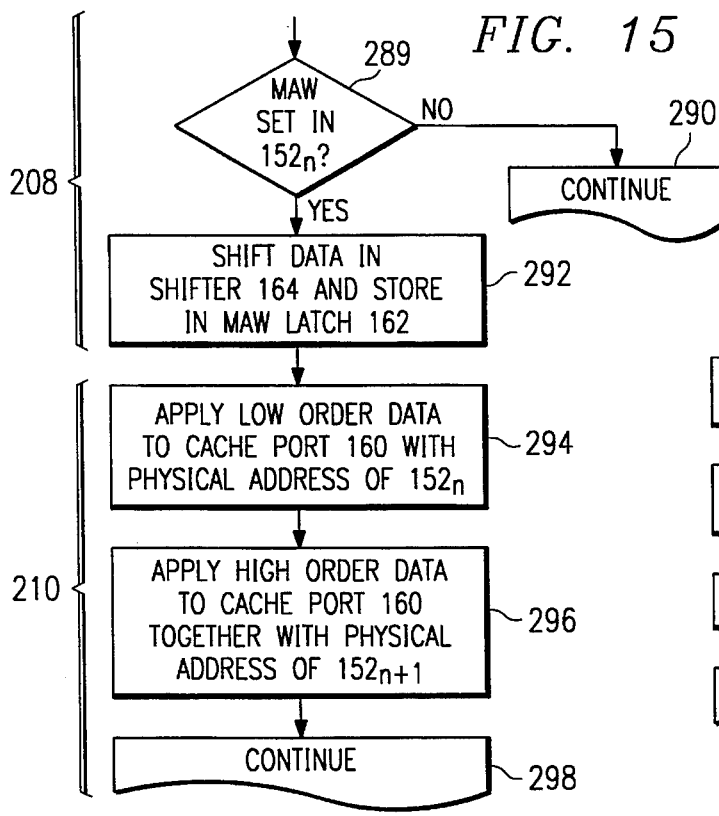
FIG. 15 is a flow chart illustrating a sequence for retiring write buffer locations for misaligned write operations, according to the preferred embodiment of the invention.

Referring now to FIG. 15, a sequence for handling the misaligned write in the retiring of a write buffer entry 152 will now be described. As in the previously described retiring sequences, the sequence of FIG. 15 is preferably performed under the control of the cache control logic with assistance from write buffer control logic 150. The sequence of FIG. 15 is performed as part of processes 208 and 210 of FIG. 10 described hereinabove. This sequence begins with decision 289, in which the misaligned control bit MAW of entry $152_n$ is tested; if clear, the retiring sequence continues (process 290 of FIG. 15) in the manner described above. However, if misaligned control bit MAW is set for entry $152_n$, process 292 is next performed in which the data portion of entry $152_n$ is latched in the appropriate misaligned data latch 162x, 162y.

The presentation of data from entry $152_n$ must be done in two memory accesses, considering the misaligned nature of the write. However, in splitting the write operation into two cycles, the data as stored in entry $152_n$ is not in the proper "byte lanes" for presentation to cache port 160. Referring back to FIG. 4, shifter 164 is a conventional barrel shifter for shifting the data presented from the corresponding write buffer section 152x, 152y prior to its storage in its misaligned write latch 162x, 162y. Shifter 164 thus is able to effect a single shift of the data in the corresponding write buffer section $152_n$, such that the lower order data will appear in the higher order bit lanes (for presentation to cache port 160 in the first, lower order address, write operation), and so that the higher order data will appear in the lower order bit lanes (for presentation to cache port 160 in the second, higher order address, write operation). This shifting is effected in process 292 of the sequence illustrated in FIG. 15.

Process 294 is next performed by way of which the physical address of entry $152_n$ is presented to cache port 160 along with the portion of the data corresponding to the lower address eight-byte group, aligned (by shifter 164 in process 292) to the byte lanes corresponding to the lower address eight-byte group. This effects the first write operation required for the misaligned write. Process 296 then presents the address and data for the second operand of the misaligned write. The physical address is that stored in the address portion of the next write buffer entry $152_{n+1}$, and the data is that retained in misaligned write latch 162 from entry $152_n$, shifted by shifter 164 to the proper byte lanes for the second access to port 160. The remainder of the retiring process then continues (process 298).

As noted above, the exception handling ability of microprocessor 10 according to this embodiment of the invention uses the state of the data valid control bit DV to determine whether an entry 152 either is or is not flushed after detection of an exception. However, in the case of a misaligned write, the second write entry $152_{n+1}$ does not have its data valid control bit DV set even if the write has been effected, since the valid data is contained within the preceding (in program order) write buffer entry $152_n$. Accordingly, if both misaligned write handling capability and exception handling as described herein are provided, the exception handling sequence must also test both misaligned write control bit MAW and data valid control bit DV for an entry $152_n$ and, if both are set, must then consider the next write buffer entry $152_{n+1}$ (in program order) to also have its data valid control bit DV set, such that entry $152_{n+1}$ is not flushed.

As a result of this construction, misaligned writes are handled by microprocessor 10 according to the present invention in a way which does not impact core 20 operation, but only includes an additional latching and aligning step during the asynchronously performed, and non-critical, retiring sequence.

5.2 Gathered writes

Another type of special write operation performable by microprocessor 10 according to this embodiment of the invention is the gathered write, where the data contained within successive write operations may be gathered into a single write access to memory. As noted above, each physical address corresponds to a byte location. If a series of writes are to be performed to one or a few bytes within the same block of bytes that may be placed on the data bus simultaneously, microprocessor 10 is able to retain the data in the appropriate byte lane so that a single write access to cache port 160 or to memory may be performed instead of successive smaller write accesses. For example, since memory data bus DATA in microprocessor 10 is sixty-four bits wide, eight bytes of data may be simultaneously written; according to the gathered write feature of the present invention, these eight bytes may be gathered from multiple write buffer entries 152 in the manner described hereinbelow.

As described hereinabove relative to the allocation sequence for write buffer 27, mergeable control bit MRG is set at the time of allocation for each write buffer entry 152 that is performing a write to a contiguous non-overlapping physical memory address with that of another write buffer entry 152 previously allocated for the immediately preceding memory write instruction in program order. The contiguousness and adjacency constraints are implemented according to this preferred embodiment of the invention in consideration of the X86-compatibility of microprocessor 10; it is contemplated, however, that write gathering may be implemented in other architectures in such a way that membership of the data in the same block of bytes is the only necessary constraint for mergeable writes. After allocation, issuing of data to the mergeable write buffer entries 152 continues in the normal manner described hereinabove.

Figure 16:
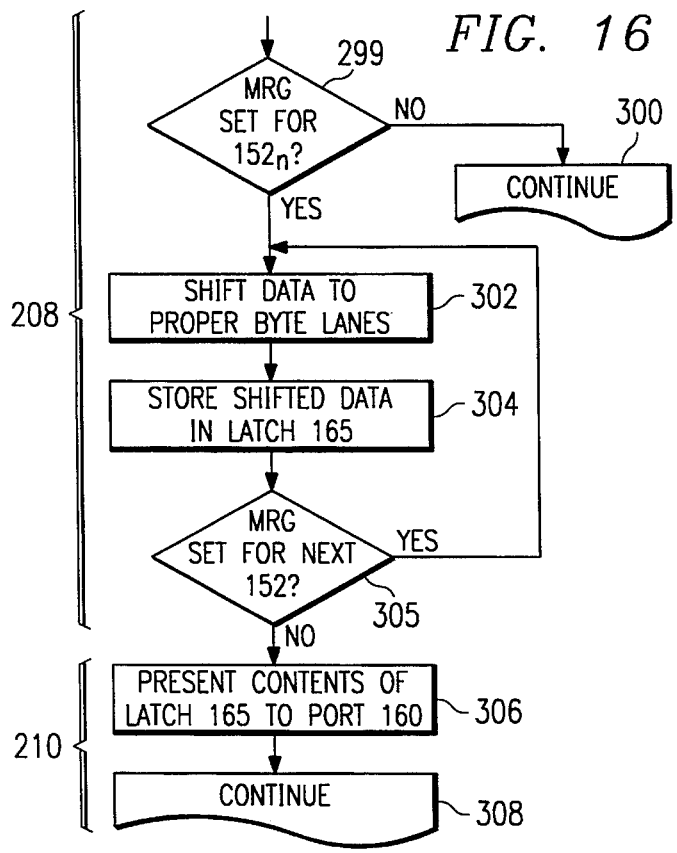
FIG. 16 is a flow chart illustrating a sequence for retiring write buffer locations for gathered write operations, according to the preferred embodiment of the invention.

Referring now to FIG. 16, the gathered write operation according to the preferred embodiment of the invention will now be described in detail. Decision 299 determines whether the mergeable control bit MRG for the current write buffer entry $152_n$ being retired is set; if not, the normal retiring sequence continues (process 300). If mergeable control bit MRG is set for the current entry $152_n$, process 302 is performed by way of which the data portion of entry $152_n$ is shifted by the appropriate shifter 164x, 164y, to the appropriate byte lanes to accommodate the gathered write. Process 304 is then performed, in which the shifted data is stored in write gather latch 165 in the proper byte lane position without disturbing data already loaded in write gather latch 165 from preceding contiguous non-overlapping writes.

Decision 305 then interrogates the next write buffer entry $152_{n+1}$ to determine if its mergeable control bit MRG is set. If so, control returns to process 302 where the data for this next entry $152_{n+1}$ is shifted and latched into write gather latch 165 in process 304. Once no more mergeable entries 152 exist, as indicated by either the mergeable control bit MRG or the address valid control bit AV being clear for the next entry 152 (in decision 305), the contents of latch 165 are presented to port 160, along with the appropriate physical address to accomplish the gathered write operation to cache 70 or main memory 86, as the case may be. The retiring process then continues as before (process 308).

According to the preferred embodiment of the invention, therefore, the efficiency of retiring data to cache or to memory is much improved by allowing for single memory accesses to accomplish the write operation in lieu of multiple accesses to contiguous memory locations.

6. Conclusion

According to the preferred embodiment of the invention, a write buffer is provided between the CPU core and the memory system (including cache memory) to provide buffering of the results of the executed instruction sequence. This enables the cache and memory reads to be performed on a high priority basis with minimum wait states due to non-time-critical write operations that may be occupying the buses or memory systems.

In addition, the preferred embodiment of the invention includes many features that are particularly beneficial for specific microprocessor architectures. Such features include the provision of two sections of the write buffer for superscalar processors, together with a technique for ensuring that the data is written to memory in program order despite the splitting of the buffer. Additional features of the preferred embodiment of the invention include the detection and handling of hazards such as data dependencies and exceptions, and provision for speculative execution of instructions with rapid and accurate flushing of the write buffer in the event of an unsuccessful prediction.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A microprocessor, comprising:

(a) a pipelined core unit including an address calculation stage, followed by an execution stage, followed by a writeback stage;

(b) a write buffer having a plurality of entries coupled to said execution stage and said writeback stage, each of said plurality of entries containing contents corresponding to a write instruction executed in said execution stage and written from said writeback stage, said contents including a data field, an address field, a data a valid control bit, and a non-cacheable write bit representing whether said write instruction is non-cacheable;

(c) a cache memory having a plurality of entries coupled to receive said data and address fields from said write buffer; and, (d) control logic circuitry coupled to said address calculation stage and to said write buffer, to compare an address of a read instruction in said address calculation stage to each of said plurality of address fields in said write buffer, and responsive to an address match, said data valid control bit being set, and said non-cacheable write bit being clear, bypassing said data field in said write buffer to said execution stage in said pipelined core unit.

2. The microprocessor of claim 1 wherein each of said plurality of entries in said write buffer further includes a readable bit representing whether said write instruction has an address field which overlaps an address field of an entry already in said write buffer and wherein said control logic is further responsive to said readable bit being set before bypassing said data field in said write buffer to said execution stage in said pipelined core unit.

3. The microprocessor of claim 1 wherein each of said plurality of entries in said write buffer further includes a write-after-read bit representing whether said write instruction follows said read instruction in program order, and wherein said control logic is further responsive to said write-after-read bit being clear before bypassing said data field in said write buffer to said execution stage in said pipelined core unit.

4. In a pipelined microprocessor, a method of buffering and bypassing results from a write instruction executed by a pipelined core unit having an address calculation stage, followed by an execution stage, followed by a writeback stage, prior to storage in a cache memory, comprising steps of:

(a) executing instructions in said execution stage;

(b) during said writeback stage for each write instruction executed in step (a), storing a data field, an address field, a data valid control bit, and a non-cacheable write bit in a write buffer having a plurality of entries;

(c) comparing an address of a read instruction in said address calculation stage to each of said address fields in said plurality of entries in said write buffer; and, (d) responsive to an address match, said data valid control bit being set, and said non-cacheable write bit being clear, bypassing said data field in said write buffer to said execution stage in said core unit.

5. A method as recited in claim 4 wherein step (d) is further responsive to a readable bit being set before bypassing said data field in said write buffer to said execution stage in said pipelined core unit.

6. A method as recited in claim 4 wherein step (d) is further responsive to a write-after-read bit being clear before bypassing said data field in said write buffer to said execution stage in said core unit.

* * * * *